(12) United States Patent
Chen et al.

(10) Patent No.: US 10,759,578 B2
(45) Date of Patent: Sep. 1, 2020

(54) MULTILAYER POUCH WITH HEAT-SHRINKABLE LAYER

(71) Applicant: Bemis Company, Inc., Neenah, WI (US)

(72) Inventors: Peter M. Chen, Appleton, WI (US); Xiangke Shi, Neenah, WI (US); Jay D. Hodson, Hortonville, WI (US); Seamus A. Wedge, Neenah, WI (US); Curtis R. Barr, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 163 days.

(21) Appl. No.: 16/078,843

(22) PCT Filed: Feb. 24, 2016

(86) PCT No.: PCT/US2016/019380
§ 371 (c)(1),
(2) Date: Aug. 22, 2018

(87) PCT Pub. No.: WO2017/146698
PCT Pub. Date: Aug. 31, 2017

(65) Prior Publication Data
US 2019/0352069 A1 Nov. 21, 2019

(51) Int. Cl.
*B65D 75/26* (2006.01)
*B32B 7/02* (2019.01)
(Continued)

(52) U.S. Cl.
CPC ............. *B65D 75/26* (2013.01); *B32B 7/02* (2013.01); *B65D 75/5833* (2013.01);
(Continued)

(58) Field of Classification Search
CPC .. B65D 75/26; B65D 75/5833; B65D 75/008; B32B 7/02; B32B 2307/306; B32B 2307/308; B32B 2307/736
See application file for complete search history.

(56) References Cited

U.S. PATENT DOCUMENTS 3,874,966 A  4/1975  Garcia
3,896,991 A  7/1975  Kozlowski et al.
(Continued)

FOREIGN PATENT DOCUMENTS

CN    2097174 U      2/1992
DE    202006015073 U1  11/2006
(Continued)

*Primary Examiner* — Michael C Miggins
(74) *Attorney, Agent, or Firm* — Lynn M. Nett

(57) ABSTRACT

A multilayer pouch with heat-shrinkable layer is described. The pouch comprises a first wall; a second wall; a perimeter comprising a first edge and a second edge opposing the first edge; and a product space positioned between the first wall, the second wall, and the perimeter. The pouch is configured to fully enclose the product space. The first wall comprises a first wall first layer having a machine direction shrinkage value of greater than 5% shrink at 90° C., a first wall second layer having a machine direction Gurley stiffness force of at least 800 mgf and a machine direction shrinkage value at 90° C. of less than the machine direction shrinkage value of the first wall first layer at 90° C., a first wall pattern connection, and a first wall air inlet. The first wall first layer is interior the first wall second layer. Various embodiments of the pouch are also described.

20 Claims, 18 Drawing Sheets

(51) Int. Cl.
  *B65D 75/58* (2006.01)
  *B65D 75/00* (2006.01)
(52) U.S. Cl.
  CPC ... *B32B 2307/306* (2013.01); *B32B 2307/308* (2013.01); *B32B 2307/736* (2013.01); *B65D 75/008* (2013.01)

(56) References Cited

U.S. PATENT DOCUMENTS

| | | |
|---|---|---|
| 3,935,993 A | 2/1976 | Doyen et al. |
| 3,978,638 A | 9/1976 | Sether |
| 4,064,302 A | 12/1977 | Kozlowski et al. |
| 4,353,497 A | 10/1982 | Bustin |
| 4,542,075 A | 9/1985 | Schirmer |
| 4,605,460 A | 8/1986 | Schirmer |
| 4,764,028 A | 8/1988 | Wood et al. |
| 4,806,371 A | 2/1989 | Mendenhall |
| 4,837,849 A | 6/1989 | Erickson et al. |
| 4,898,477 A | 2/1990 | Cox et al. |
| 4,985,300 A | 1/1991 | Huang |
| 5,174,658 A | 12/1992 | Cook et al. |
| 5,184,896 A | 2/1993 | Hammond et al. |
| 5,302,402 A | 4/1994 | Dudenhoeffer et al. |
| 5,624,367 A | 4/1997 | Budziszewski |
| 5,741,535 A | 4/1998 | Cope et al. |
| 5,996,884 A | 12/1999 | Frisk |
| 6,060,096 A | 5/2000 | Hanson et al. |
| 6,135,936 A | 10/2000 | Brown |
| 6,152,363 A | 11/2000 | Rule, Jr. |
| 6,264,100 B1 | 7/2001 | Brown et al. |
| 6,291,037 B1 | 9/2001 | Bakker et al. |
| 6,364,149 B1 | 4/2002 | Smith |
| 6,397,560 B1 | 6/2002 | Weder |
| D470,406 S | 2/2003 | Espinel et al. |
| D470,407 S | 2/2003 | Espinel et al. |
| D470,755 S | 2/2003 | Espinel et al. |
| D470,756 S | 2/2003 | Espinel et al. |
| D470,757 S | 2/2003 | Espinel et al. |
| 6,536,657 B2 | 3/2003 | Van Handel |
| 6,571,510 B2 | 6/2003 | Weder |
| 6,722,106 B2 | 4/2004 | Bartel et al. |
| 6,729,534 B2 | 5/2004 | Van Handel |
| 6,739,470 B2 | 5/2004 | Yawata |
| 6,852,381 B2 | 2/2005 | Debraal et al. |
| 7,108,906 B2 | 9/2006 | Benim et al. |
| D545,216 S | 6/2007 | O'Keefe et al. |
| 7,293,652 B2 | 11/2007 | Learn et al. |
| 7,347,623 B2 | 3/2008 | Cawley |
| 7,398,631 B2 | 7/2008 | Learn |
| 7,452,590 B1 | 11/2008 | Benim et al. |
| 7,464,856 B2 | 12/2008 | Van Handel |
| 7,464,857 B2 | 12/2008 | Van Handel |
| 7,510,098 B2 | 3/2009 | Hartjes et al. |
| 7,513,386 B2 | 4/2009 | Hartjes et al. |
| 7,523,824 B2 | 4/2009 | Weder |
| 7,527,839 B2 | 5/2009 | Busche et al. |
| 7,543,990 B2 | 6/2009 | Michalsky |
| 7,600,669 B2 | 10/2009 | Van Handel |
| 7,614,993 B2 | 11/2009 | Van Handel |
| D615,875 S | 5/2010 | Schiffman et al. |
| 7,754,257 B2 | 7/2010 | Matsumoto et al. |
| 7,806,269 B2 | 10/2010 | Learn |
| 7,841,974 B2 | 11/2010 | Hartjes et al. |
| 7,913,873 B2 | 3/2011 | Van Handel |
| 7,923,669 B2 | 4/2011 | Wnek et al. |
| 7,938,313 B1 | 5/2011 | Van Handel |
| 7,964,255 B2 | 6/2011 | Fink et al. |
| 8,053,047 B2 | 11/2011 | Siegel et al. |
| 8,251,217 B2 | 8/2012 | Hemmerlin et al. |
| 8,286,824 B2 | 10/2012 | Ikeda et al. |
| D671,012 S | 11/2012 | France et al. |
| 8,622,232 B2 | 1/2014 | Pounder et al. |
| 8,622,619 B2 | 1/2014 | Adams et al. |
| 9,056,712 B2 | 6/2015 | Cook et al. |
| 9,254,061 B2 | 2/2016 | Harl et al. |
| 2002/0195368 A1 | 12/2002 | Weder |
| 2003/0002755 A1 | 1/2003 | Kim et al. |
| 2003/0172624 A1 | 9/2003 | Bartel et al. |
| 2004/0005100 A1 | 1/2004 | Versluys |
| 2004/0058118 A1 | 3/2004 | Fink |
| 2005/0079251 A1 | 4/2005 | Bell |
| 2005/0184136 A1 | 8/2005 | Baynum |
| 2006/0177612 A1 | 8/2006 | Peterka |
| 2007/0248292 A1 | 10/2007 | Wolf |
| 2007/0269142 A1 | 11/2007 | Tyska et al. |
| 2008/0101733 A1 | 5/2008 | Fenn-Barrabass et al. |
| 2009/0258191 A1 | 10/2009 | Peacock |
| 2009/0272753 A1 | 11/2009 | Rebelak, Sr. et al. |
| 2010/0068353 A1 | 3/2010 | Gorman et al. |
| 2010/0307948 A1 | 12/2010 | Domingues et al. |
| 2011/0192754 A1 | 8/2011 | Slominski et al. |
| 2012/0010060 A1 | 1/2012 | Fenn-Barrabass et al. |
| 2012/0061385 A1 | 3/2012 | France et al. |
| 2012/0312869 A1 | 12/2012 | Fike et al. |
| 2013/0309375 A1 | 11/2013 | Berbert |
| 2013/0341387 A1 | 12/2013 | Fike |
| 2014/0087145 A1 | 3/2014 | Shelby et al. |
| 2014/0087147 A1 | 3/2014 | Shelby et al. |
| 2015/0083789 A1 | 3/2015 | Fitzwater et al. |
| 2015/0111092 A1 | 4/2015 | Janousek et al. |

FOREIGN PATENT DOCUMENTS

| | | |
|---|---|---|
| EP | 0209148 A2 | 1/1987 |
| EP | 0223253 A2 | 5/1987 |
| EP | 0823388 A1 | 2/1998 |
| EP | 1659070 A1 | 5/2006 |
| JP | H06219474 A | 8/1994 |
| JP | 2007137468 A | 6/2007 |
| JP | 2011025944 A | 2/2011 |
| JP | 2011098544 A | 5/2011 |
| WO | 2003022708 A1 | 3/2003 |
| WO | 2006095730 A1 | 9/2006 |
| WO | 2014133573 A1 | 9/2014 |
| WO | 2014204465 A1 | 12/2014 |
| WO | 2015054402 A1 | 4/2015 |
| WO | 2015179651 A2 | 11/2015 |

MULTILAYER POUCH WITH HEAT-SHRINKABLE LAYER

The present application describes a pouch with at least one multilayer wall with a heat-shrinkable layer, specifically, a multilayer-walled pouch having at least one such heat-shrinkable layer and providing heat resistance, stiffness and durability.

BACKGROUND

Pouches are used for many purposes. These many purposes include but are not limited to providing a container for transporting an item, providing a container for heating an item in the microwave, and providing a container for consuming an item.

U.S. Pat. No. 7,964,255 (Fink et al.) discloses a heat-shrinkable multilayer material which uses a microwave susceptible material to create areas of increased stiffness in the multilayer material when microwave energy is applied. This multilayer material relies on the microwave susceptible material, rather than elevated temperatures alone, to create stiffness. As such, this material is more expensive and complicated to produce.

U.S. Pat. No. 8,622,232 (Pounder et al.) discloses a container suitable for providing insulation from hot beverage contents. The container has an inner shrink film liner. However, the container is bulky; it does not have a relatively flat shape and does not lay-flat, contributing to increased costs in transportation. Furthermore, the container does not fully-enclose the product space and, as such, is not self-sufficient.

WO 2014/204465 (Brosch et al.) discloses a self-standing container having a continuous side wall and a heat-shrinkable connecting wall. This container requires a heat-shrinkable bottom and, as such, does not provide sufficient heat resistance along the continuous side wall.

SUMMARY

Existing pouches and containers do not provide a container that is easily transportable and that provides heat resistance, stiffness and durability. This need is met by the pouch described in the present application. This pouch comprises a first wall; a second wall; a perimeter comprising a first edge and a second edge opposing the first edge; and a product space positioned between the first wall, the second wall, and the perimeter. The pouch is configured to fully enclose the product space. The first wall comprises a first wall first layer having a machine direction shrinkage value of greater than 5% shrink at 90° C. a first wall second layer having a machine direction Gurley stiffness force of at least 800 mgf and a machine direction shrinkage value at 90° C. of less than the machine direction shrinkage value of the first wall first layer at 90° C., a first wall pattern connection, and a first wall air inlet. The first wall first layer is interior the first wall second layer.

In some embodiments, the first wall first layer may comprise polypropylene, polyethylene, polyamide, polyester, polystyrene, cyclic olefin copolymer, ethylene vinyl-alcohol copolymer, polyvinylidene chloride, ionomer, or blends of such. The first wall first layer may have a machine direction shrinkage value from greater than 5% to 70% shrink at 90° C. or, in some embodiments, from 10% shrink to 50% shrink at 90° C. The first wall first layer may be an interior layer of the pouch.

In some embodiments, the first wall second layer may comprise paperboard, nonwoven, polypropylene, polyethylene, polyamide, polyester, polystyrene, cyclic olefin copolymer, polyvinyl chloride, ionomer, or blends of such. The first wall second layer may have a machine direction Gurley stiffness force of from 800 mgf to 12,000 mgf and/or may have a thickness of from 10 mil (254 micron) to 20 mil (508 micron). The first wall second layer may comprise a bending point.

The first wall pattern connection may be between the first wall first layer and the first wall second layer, or, if the first wall first layer is a multilayer film, may be in the first wall first layer, or, if the first wall second layer is a multilayer film, may be in the first wall second layer. The first wall air inlet may comprise a hole through the first wall first layer, a hole through the first wall second layer, or a hole in the first wall pattern connection adjacent the perimeter.

In some embodiments, the second wall may comprise paperboard, nonwoven, polypropylene, polyethylene, polyamide, polyester, polystyrene, cyclic olefin copolymer, ethylene vinyl-alcohol copolymer, polyvinylidene chloride, polyvinyl chloride, ionomer, or blends of such.

In other embodiments, the second wall may comprise a second wall first layer having a machine direction shrinkage value of greater than 5% shrink at 90° C., a second wall second layer having a machine direction Gurley stiffness force of at least 800 mgf and a machine direction shrinkage value at 90° C. of less than machine direction shrinkage value of the second wall first layer at 90° C., a second wall pattern connection, and a second wall air inlet. In such an embodiment, the second wall first layer is interior the second wall second layer. The second wall first layer may comprise polypropylene, polyethylene, polyamide, polyester, polystyrene, cyclic olefin copolymer, ethylene vinyl-alcohol copolymer, polyvinylidene chloride, ionomer, or blends of such. The second wall first layer may have a machine direction shrinkage value of from greater than 5% shrink to 70% shrink at 90° C. or, in some embodiments, from 10% shrink to 50% shrink at 90° C. The second wall first layer may be an interior layer of the pouch. The second wall second layer may paperboard, nonwoven, polypropylene, polyethylene, polyamide, polyester, polystyrene, cyclic olefin copolymer, polyvinyl chloride, ionomer, or blends of such. The second wall second layer may have a machine direction Gurley stiffness force of from 800 mgf to 12,000 mgf and/or may have a thickness of from 10 mil (254 micron) to 20 mil (508 micron). The second wall pattern connection may be between the first wall first layer and the first wall second layer, or, if the second wall first layer is a multilayer film, may be in the first wall first layer, or, if the second wall second layer is a multilayer film, may be in the first wall second layer. The second wall air inlet may comprise a hole through the second wall first layer, a hole through the second wall second layer or a hole in the second wall pattern connection adjacent the perimeter.

In some embodiments, the perimeter further comprises a third edge between the first edge and the second edge, and this third edge may comprise a third edge gusset member formed in a fold between and connecting the first wall and the second wall or inserted and sealed between and connecting the first wall and the second wall. The third edge gusset member may comprise a material having a machine direction shrinkage value of from 0% shrink to 70% shrink at 90° C. or, in some embodiments, from 0% shrink to 5% shrink at 90° C.

In some embodiments, the third edge is substantially perpendicular to the first edge and the second edge, and the perimeter further comprises a fourth edge opposing the third edge. This fourth edge may comprise a fourth edge gusset member formed in a fold between and connecting the first wall and the second wall or inserted and sealed between and connecting the first wall and the second wall. The fourth edge gusset member may comprise a material having a machine direction shrinkage value of from 0% shrink to 70% shrink at 90° C.

In some embodiments, the pouch is free of a susceptor shrink material in direct contact with the first wall first layer and/or the second wall first layer.

In some embodiments, the first edge may comprise a first seal comprising the first wall second layer and the second wall second layer, the second edge may comprise a second seal comprising the first wall second layer and the second wall second layer, and, in such embodiment, the first wall second layer may comprise a bending point.

In some embodiments, the pouch may comprise an opening mechanism to access the product space, and such opening mechanism may be located in the second wall or may be located adjacent the fourth edge.

In some embodiments, upon activation of the opening mechanism and exposure to elevated temperatures, an edge distance between the first edge and the second edge may decrease and a fourth edge midpoint distance between the first wall and the second wall may increase. In such embodiments, the ratio of the edge distance to the fourth edge midpoint distance may be from 0.7 to 1.3.

DETAILED DESCRIPTION

Figure 1:
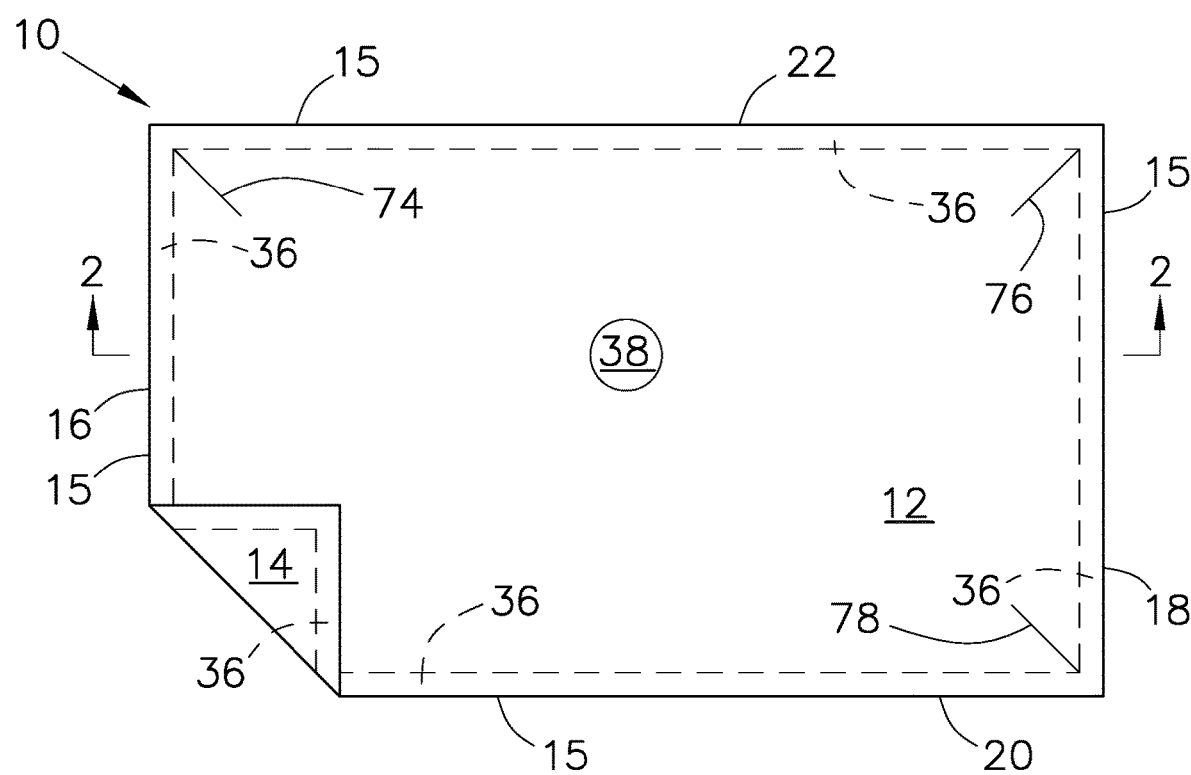
FIG. 1 is a schematic top view of a first embodiment of a pouch according to the present application.

As used throughout this application, the term "pouch" refers to a bag, container, package, or otherwise usually constructed by sealing one or two films or sheets along the edges.

As used throughout this application, the term "film" refers to a plastic web of any thickness and is not limited to a plastic web having a thickness of less than 10 mil (254 micron). The term "sheet" refers to a plastic web of any thickness and is not limited to a plastic web having a thickness of greater than 10 mil (254 micron). As used throughout this application, the term "web" refers to a continuous film or a continuous sheet.

As used throughout this application, the term "fully enclose" refers to a configuration in which an item or items packaged is (or are) not materially exposed to an atmosphere external the packaging.

As used through this application, the term "product space" refers to an interior section of a pouch configured to hold an item or items to be packaged in the container.

As used throughout this application, the term "layer" refers to a discrete film or sheet component which may or may not be coextensive with the film or sheet but has a substantially uniform composition. In referring to a monolayer film, "film," "sheet" and "layer" are synonymous.

As used throughout this application, the term "pattern connection" refers to an attachment between two layers that includes a portion or portions of the area but not the entire area between the two layers. A pattern connection may be in the form of, for example, a pattern seal (e.g., a heat, impulse, ultrasonic, pressure or other seal attaching only portions of the two layers to one another) or a pattern connecting layer (e.g., adhesive applied to only portions of the area between two layers). A "pattern connection" is in contrast to a "flood connection." As used throughout this application, a "flood connection" refers to an attachment between two layers that includes the entire area between the two layers. A pattern connection or a flood connection may serve to temporarily or permanently attach two layers.

As used throughout this application, the term "interior" refers to a relative position closer to the innermost surface of a film, sheet, web, package or other article. The term "exterior" refers to a relative position closer to the outermost surface of a film, sheet, web, package or other article. Accordingly, the term "interior layer" refers to a layer comprising the innermost surface of a film, sheet, web, package or other article. The term "exterior layer" refers to a layer comprising the outermost surface of a film, sheet, web, package or other article. Additionally, the exterior layer and the interior layer each have an inner surface and an outer surface. The term "inner surface" refers to a surface touching another layer, and the term "outer surface" refers to a surface not touching another layer.

As used throughout this application, the term "a hole" refers to one or more then one hole, vent, slit, slot, perforation, notch, puncture, orifice, opening, gap, channel, score, or other means through which fluid (i.e., gas or liquid) may flow.

As used throughout this application, the term "adjacent" refers to being near, close, contiguous, adjoining or neighboring in proximity. It includes but is not limited to being reasonably close to or in the vicinity of as well as touching, having a common boundary or having direct contact.

As used throughout this application, the term "coextensive" refers to the relationship between two layers where the width of one layer is substantially equal to the width of a second layer and at least two side edges of one layer substantially coincide with at least two side edges of a second layer.

As used throughout this application, the term "susceptor shrink material" refers to a material that transforms microwave energy into heat which shrinks a portion, portions or the entirety of a heat-shrinkable layer or wall.

As used throughout this application, the term "machine direction" or "MD" refers to the direction of film transport during or after extrusion or film conversion. For the pouch described in the present application, such direction corresponds to the direction from the first edge of the pouch to the second edge (as further described below). As such, as used throughout this application, the term "machine direction shrinkage" refers to shrinkage in a direction from the first edge of the pouch to the second edge. As used throughout this application, the term "transverse direction" or "TD" refers to the direction perpendicular to the machine direction (such as a direction from a third edge of a pouch to a fourth edge).

As used throughout this application, the term "MD orientation ratio" refers to the ratio of oriented stretch length in the MD to the unstretched length accomplished by, for example, pulling or drawing the film by a pair of rollers rotating at different speeds. Films described in the present application may have a MD orientation ratio of from 2:1 to 5:1 or higher. As used throughout this application, the term "TD orientation ratio" refers to the ratio of oriented stretch length in the TD to the unstretched length accomplished by, for example, radially expanding a heated tube of film. Films described in the present application may have a TD orientation ratio of from 2:1 to 5:1 or higher. As known in the art, temperature and rate of stretching may affect shrinkage values.

As used throughout this application, the term "shrinkage value" refers to values obtained by measuring unrestrained (or free) shrink of a ten-centimeter square sample immersed in water at 90° C. (or the indicated temperature if different) for five seconds. In such method, four test specimens are cut from a given sample of the film to be tested. The specimens are cut into squares of ten-centimeter length in the machine direction by ten-centimeter length in the transverse direction. Each specimen is completely immersed for five seconds in a 90° C. (or the indicated temperature if different) water bath. The specimen is then removed from the bath and the distance between the ends of the shrunken specimen is measured for both the machine and transverse directions. The difference in the measured distance for the shrunken specimen and the original ten-centimeter side is multiplied by ten to obtain the percent of shrinkage for the specimen in each direction.

As used throughout this application, the term "shrink force" refers to the force or stress (in, for example, grams) exerted by the film as the film contracts under heat. The shrink force of a film is equal to the force or stress required to prevent shrinkage of the film under specified conditions. A value representative of the shrink force may be obtained using an Instron® Tensile Testing Unit with a heated chamber. In such method, the position of the sample is held constant, and the temperature is ramped up. The Instron® Tensile Testing Unit software is used to collect force versus time data. The temperature/time is manually recorded throughout each run, and time data is converted to temperature. Specifically, shrink force data is collected using the following run conditions: Rectangular specimens of one-inch width are cut from sample films with the long axis parallel to either the machine or transverse direction. The specimens are clamped at the short ends so that the force to be measured is applied along the long axis. The specimen is clamped with minimal force at 25° C. One clamp is stationary, while the other clamps are housed in a small oven whose heating rate is accurately controlled. The temperature controller is set to 400° C. to quickly ramp up temperature. The test time/speed is set to 5 minutes at 0 millimeters per minute. The test is started and the temperature is ramped up as soon as the operator closes the door. The specimen is heated and the force needed to hold the movable clamp at a fixed distance from the stationary clamp is measured. The Instron® Tensile Testing Unit software records force versus time; the data collection speed is 100 millisecond per data point. The operator manually records force, time and temperature in 5° C. increments. The force measured is equal to (and opposite) the shrink force.

As used throughout this application the term "cyclic olefin copolymer" or 'COC" refers to a class of polymeric materials based on cyclic olefin monomers and ethane, with one or more different cyclic olefin units randomly or alternately attached to an ethylene polymer backbone. Ethylene/norbornene copolymers are a non-limiting example of cyclic olefin copolymers. Specific non-limiting examples of cyclic olefin copolymer are TOPAS® 8007F-04, TOPAS® 8007F-600 and TOPAS® 5013F-04 (each available from Topas Advanced Polymers (Florence, Ky.)).

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four or more monomer species having reaction products referred to terpolymers, quaterpolymers, etc.

As used throughout this application, the term "polyethylene" or "PE" refers (unless indicated otherwise) to ethylene homopolymers or copolymers. Such copolymers of ethylene include copolymers of ethylene with at least one alpha-olefin and copolymers of ethylene with other units or groups such as vinyl acetate or otherwise. The term "polyethylene" or "PE" is used without regard to the presence or absence of substituent branch groups. PE includes, for example, high density polyethylene, low density polyethylene, ethylene alpha-olefin copolymer, ethylene vinyl acetate, and blends of such.

As used throughout this application, the term "high density polyethylene" or "HDPE" refers to both (a) homopolymers of ethylene which have densities from 0.960 g/cm$^3$ to 0.970 g/cm$^3$ and (b) copolymers of ethylene and an alpha-olefin (usually 1-butene or 1-hexene) which have densities from 0.940 g/cm$^3$ to 0.958 g/cm$^3$. HDPE includes polymers made with Ziegler or Phillips type catalysts and polymers made with single-site metallocene catalysts. HDPE also includes high molecular weight "polyethylenes." In contrast to HDPE, whose polymer chain has some branching, are "ultra high molecular weight polyethylenes," which are essentially unbranched specialty polymers having a much higher molecular weight than the high molecular weight HDPE. Specific non-limiting examples of HDPE are HDPE 6420 (available from Total Petrochemicals USA, Inc. (Houston, Tex.)) and SURPASS® HPs 167-AB (available from Nova Chemicals Corporation (Calgary, Alberta, Canada)).

As used throughout this application, the term "low density polyethylene" or "LDPE" refers to branched homopolymers having densities from 0.915 g/cm$^3$ to 0.930 g/cm$^3$, as well as copolymers containing polar groups resulting from copolymerization (such as with vinyl acetate or ethyl acrylate). LDPE typically contains long branches off the main chain (often termed "backbone") with alkyl substituents of two to eight carbon atoms. Specific non-limiting examples of LDPE are EG412AA and EC478AA (available from Westlake Chemical Corporation (Houston, Tex.)) and Petrothene® NA963 (available from LyondellBasell Industries (Houston, Tex.)).

As used throughout this application, the terms "copolymer of ethylene and at least one alpha-olefin" or "ethylene alpha-olefin copolymer" refer to a modified or unmodified copolymer produced by the co-polymerization of ethylene and any one or more alpha-olefins. Suitable alpha-olefins include, for example, $C_3$ to $C_{20}$ alpha-olefins such as propene, 1-butene, 1-pentene, 1-hexene, 1-octene, 1-decene and blends of such. Ethylene alpha-olefin copolymers may include, for example, metallocene linear medium density polyethylene (mLMDPE), linear low density polyethylene (LLDPE), very low density polyethylene (VLDPE) and ultra low density polyethylene (ULDPE). The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed to trialkyl aluminum.

Alternatively, the co-polymerization of ethylene and an alpha-olefin may be produced by homogeneous catalysis, such as co-polymerization reactions with metallocene catalysis systems which include constrained geometry catalysts, (e.g., monocyclopentadienyl transition-metal complexes). Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer (commercially available as, for example, Affinity™ from The Dow Chemical Company (Midland, Mich.)), linear copolymers (commercially available as, for example, Tafmer™ from the Mitsui Petrochemical Corporation (Tokyo, Japan)), and modified or unmodified ethylene alpha-olefin copolymers having a short-chain branched (i.e., 3-6 pendant carbons atoms) alpha-olefin co-monomer (commercially available as, for example, Exact™ from ExxonMobil Chemical Company (Houston, Tex.)). Specific non-limiting examples of VLDPE are ATTANE™ NG 4701G (available from The Dow Chemical Company (Midland, Mich.)), Exceed® 3512CB (available from ExxonMobil Corporation (Houston, Tex.)), and MXSTEN® CV77526 (available from Westlake Chemical Corporation (Houston, Tex.)). Specific non-limiting examples of LLDPE are ExxonMobil™ LLDPE LL 1001.32 and ExxonMobil™ LLDPE LL 6202.19 (each available from ExxonMobil Corporation (Houston, Tex.)); DOWLEX™ 2056G, DOWLEX™ 2045G, and DOWLEX™ 2645G (each available from The Dow Chemical Company (Midland. Mich.)); SC74580 (available from Westlake Chemical Corporation (Houston, Tex.)); and SCLAIR® FP120-A (available Nova Chemicals Corporation (Calgary, Alberta, Canada)). Specific non-limiting examples of LLDPE, particularly metallocene-catalyzed LLDPE (mLLDPE) are Exceed™ 3812, Exceed™ 1018LH. Exact™ 3139, and Exact™ SLP 9523 (each available from ExxonMobil Corporation (Houston, Tex.)). A specific non-limiting example of mLMDPE is Enable™ 35-05HH (available from ExxonMobil Corporation (Houston, Tex.)).

As used throughout this application, the term "ethylene vinyl acetate" or "EVA" refers to copolymers comprised of repeating units of ethylene and vinyl acetate. Ethylene vinyl acetate copolymers may be represented by the general formula: $[(CH_2-CH_2)_n-(CH_2-CH(COO)(CH_3)]_n$. The vinyl acetate content may vary from less than 10% to greater than 95% by weight (of total EVA composition). The vinyl acetate content of EVA for packaging applications may vary from 5% to 40% by weight. Specific non-limiting examples of EVA are DuPont™ Elvax® 3135X, having vinyl acetate content of 12% by weight, and DuPont™ Elvax® 3165, having vinyl acetate content of 18% by weight (each available from E.I. du Pont de Nemours and Company, Inc. (Wilmington, Del.)); and Escorene™ Ultra LD 720.01, having vinyl acetate content of 18% by weight, Escorene™ Ultra LD 730.09, having vinyl acetate content of 17.2% by weight, and ExxonMobil™ LDPE LD 306.38, having vinyl acetate content of 5.5% by weight (available from ExxonMobil Corporation (Houston, Tex.)).

As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters and metal salts derived from such.

As used throughout this application, the term "polystyrene" or "PS" or "styrenic polymer" refers to a homopolymer or copolymer having at least one styrene monomer linkage (such as benzene (i.e., $C_6H_6$) having an ethylene substituent) within the repeating backbone of the polymer. The styrene linkage may be represented by the general formula: $[CH_2-CH_2 (C_6H_5)]_n$. Examples of styrenic polymers include but are not limited to high impact polystyrene (HIPS), general purpose polystyrene (GPPS) and styrene butadiene copolymer (SBC). A specific non-limiting example of SBC is KR53 K-Resin® (available from Chevron Phillips Chemical Company LP (The Woodlands, Tex.)).

As used throughout this application, the term "processing aids" refers to anti-block agents, slip agents, stabilizing agents, release agents, lubricating agents, anti-oxidants, photo-initiators, primers, colorants, and other additives known to and used by a person of ordinary skill in the art without undue experimentation. The uses of processing aids varies depending on the equipment, materials, desired aesthetics, etc.

As used throughout this application, the term "tie material" or "tie" refers to a polymeric material serving a primary purpose or function of adhering two surfaces to one another, such as the planar surfaces of two film layers. For example, a tie material adheres one film layer surface to another film layer surface or one area of a film layer surface to another area of the same film layer surface. Tie material may comprise any polymer, copolymer or blend of polymers having a polar group or any other polymer, homopolymer, copolymer or blend of polymers, including modified and unmodified polymers (such as grafted copolymers) which provide sufficient interlayer adhesion to adjacent layers comprising otherwise non-adhering polymers. Specific non-limiting examples of tie materials are DuPont™ Bynel® 41E710 and DuPont™ Bynel® 41E687 (each available from E.I. du Pont de Nemours and Company, Inc. (Wilmington, Del.)), Plexar® PX3747 and Plexar® PX3227 (each available from LyondellBasell Industries (Houston, Tex.)), Tymax™ GT4157 and Tymax™ GT4524 (each available from Westlake Chemical Corporation (Houston, Tex.)), and ADMER® SF755A (available from Mitsui Chemicals America, Inc. (Rye Brook, N.Y.)).

As used throughout this application, the term "polyamide" or "PA" or "nylon" refers to a homopolymer or copolymer having an amide linkage between monomer units and formed by any method known in the art. The amide linkage may be represented by the general formula: $[(C(O)—R—C(O)—NH—R'—NH]_n$ where R and R' are the same or different alkyl (or aryl) group. Nylon polymers may be high-temperature, low-temperature or amorphous, as described in, for example, International Publication Number WO 2006/063283. Examples of nylon polymers include but are not limited to nylon 6 (polycaprolactam), nylon 11 (polyundecanolactam), nylon 12 (polyauryllactam), nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (poyheptamethylene pimelamide), nylon 8,8 (polyoctamethylene suberamide), nylon 9,9 (polynonamethylene azelamide), nylon 10,9 (polydecamethylene azelamide), and nylon 12,12 (polydodecamethylene dodecanediamide). A specific non-limiting example of nylon 6 is Ultramid® B36 01 (available from BASF Corporation (Wyandotte, Mich.)). Examples of nylon copolymers include but are not limited to nylon 6,6/6 copolymer (polyhexamethylene adipamide/caprolactam copolymer), nylon 6,6/9 copolymer (polyhexamethylene adipamide/azelamide copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), and nylon 6,6/6,9/6 copolymer (polyhexamethylene adipamide/hexamethylene azelamide/caprolactam copolymer). A specific non-limiting example of nylon6/6,6 copolymer is Ultramid® C40 L 07 (available from BASF Corporation (Wyandotte, Mich.)). A specific non-limiting example of nylon 6,6/9 copolymer is Grivory® BM 13 SBG (available from EMS-CHEMIE (North America) Inc. (Sumter, S.C.)). Examples of aromatic nylon polymers (also sometimes referred to as "amorphous polyamide" or "amorphous nylon") include but are not limited to nylon 4.1, nylon 6,I, nylon 6,6/6I copolymer, nylon 6,6/6T copolymer, nylon MXD6 (poly-m-xylylene adipamide), poly-p-xylylene adipamide, nylon 6I/6T copolymer, nylon 6T/6I copolymer, nylon MXDI, nylon 6/MXDT/II copolymer, nylon 6T (polyhexamethylene terephthalamide), nylon 12T (polydodecamethylene terephthalamide), nylon 66T, and nylon 6-3-T (poly(trimethyl hexamethylene terephthalamide). A specific non-limiting example of nylon 6I/6T copolymer is DuPont™ Selar® PA 3426 (available from E.I. du Pont de Nemours and Company, Inc. (Wilmington, Del.)).

As used throughout this application, the term "ethylene vinyl alcohol copolymer" or "EVOH" refers to copolymers comprised of repeating units of ethylene and vinyl alcohol. Ethylene vinyl alcohol copolymers may be represented by the general formula: $[(CH_2—CH_2)_n—(CH_2—CH(OH))]_n$. Ethylene vinyl alcohol copolymers may include saponified or hydrolyzed ethylene vinyl acetate copolymers. EVOH refers to a vinyl alcohol copolymer having an ethylene co-monomer and prepared by, for example, hydrolysis of vinyl acetate copolymers or by chemical reactions with vinyl alcohol. Ethylene vinyl alcohol copolymers may comprise from 28 mole percent (or less) to 48 mole percent (or greater) ethylene. Specific non-limiting examples of EVOH are Soarnol™ DT2904R, having 29 mole percent ethylene, Soamol™ ET3803RB, having 38 mole percent ethylene, and Soamol™ AT4403, having 44 mole percent ethylene (each available from Soarus LLC (Arlington Heights, Ill.)); and EVAL™ F171B, having 32 mole percent ethylene, and EVAL™ SP, having 38 mole percent ethylene (each available from Kuraray America Inc. (Houston, Tex.))

As used throughout this application, the term "polypropylene" or "PP" refers to a plastomer, homopolymer or copolymer having at least one propylene monomer linkage within the repeating backbone of the polymer. The propylene linkage may be represented by the general formula: $[CH_2—CH(CH_3)]_n$. Such polypropylene may be a polypropylene impact copolymer, a polypropylene random copolymer or a polypropylene homopolymer, may be syndiotactic or isotactic, and/or may or may not be clarified. Specific non-limiting examples of polypropylene impact copolymer are Polypropylene 4170 (available from Total Petrochemicals USA, Inc. (Houston. Tex.)) and Adfex Q 100 F (available from LyondellBasell Industries (Houston, Tex.)). Specific non-limiting examples of polypropylene random copolymer are CP301 (available from Copol International Ltd. (North Sydney, Nova Scotia, Canada)) and Polypropylene 8473 (available from Total Petrochemicals USA, Inc. (Houston, Tex.)). Specific non-limiting examples of polypropylene homopolymer are Polypropylene H110-02N (available from Braskem (Philadelphia, Pa.)); Medical Polypropylene 7020 and Medical Polypropylene 7000 (each available from Pacur LLC (Oshkosh, Wis.)); Pentapharm Rigid PP 206380 (available from Klöckner Pentaplast (Gordonsville, Va.)); and 12-mil (305-micron) high clarity PP sheet, 14-mil (356-micron) high clarity PP sheet, and 18-mil (457-micron) high clarity PP sheet (each available from Hip Lik Packaging Products Ltd. (HLP Packaging) (New York, N.Y.)).

As used throughout this application, the term "polyolefin" (or "polyalkene") refers to any class of polymers produced from an alkene (or "olefin") with the general formula $C_nH_{2n}$. Non-limiting examples of polyolefins are polyethylenes and polypropylenes.

As used throughout this application, the term "Gurley stiffness" refers to a resistance force (in, for example, milligrams) of a sample of paper, paperboard or other flexible material in each and/or either of its machine direction and/or transverse direction. Gurley stiffness may correlate to the rigidity of a material, and such stiffness/rigidity values may be determined in accordance with TAPPI T 543 ("Bending Resistance (Stiffness) of Paper (Gurley-Type Stiffness Tester) and/or ASTM D6125-97 (Standard Test Method for Bending Resistance of Paper and Paperboard (Gurley Type Tester)." A suitable testing apparatus is a Digital Bending Resistance/Stiffness Tester Model 4171DS1N (available from Gurley Precision Instruments (Troy, N.Y.)). This instrument allows testing of a wide variety of materials through the use of various lengths and widths in combination with the use of a 5, 25, 50, or 200 gram weight placed in one of three positions relative to the pointer/pivot of the instrument.

As used throughout this application, the term "paperboard" refers to cellulosic materials produced from hardwood fibers (including but not limited to acacia, ash, balsa, basswood, beech, birch, cherry, cottonwood, elm, eucalyptus, hickory, mahogany, maple, oak, poplar, rosewood, sumac, sycamore and walnut), softwood fibers (including but not limited to cedar, fir, hemlock, pine, redwood and spruce), non-wood fibers (including but not limited to those from hairs on seeds, such as cotton, kapok and milkweed; those from stems of plants, such as bagasse, bamboo, flax, hemp, jute, kenaf and ramie; those from leaves of plants, such as agave, banana and pineapple; those from the stalks and leaves of maize, those from algae (algal cellulose), those from bacteria (bacterial cellulose), those from sugar beet pulp and those from citrus pulp); and/or fibers manufactured from cellulose (including but not limited to derivative or regenerated fibers). In some embodiments, paperboard may be produced by the Kraft process. In some embodiments, paperboard may be solid bleach board (SBB) or solid bleached sulfate (SBS), produced from bleached chemical pulp. Such SBB or SBS may have a mineral or synthetic pigment coated top surface in one or more layers (C1S) and may also have a coating on the reverse side (C2S). Specific non-limiting examples of paperboard produced by the Kraft process are various grades of Kraft Liner Matizado (available from Copamex North America (Arlington, Tex.)). Specific non-limiting examples of SBS board are various grades of Citadel® C1S SBS Board, including coated gloss and coated matte (available from Verso Corporation (Stevens Point, Wis.)) and various grades of CartonMate® Bleached Board, including grades with polyethylene coating (available from WestRock Company (Richmond, Va.)).

As used throughout this application, "nonwoven" refers to not woven, knitted or felted.

As used throughout this application, the term "polyester" refers to a homopolymer or copolymer having an ester linkage between monomer units. The ester linkage may be represented by the general formula $[O-R-OC(O)-R'-C(O)]_n$ where R and R' are the same or different alkyl (or aryl) group and may generally be formed from the polymerization of dicarboxylic acid and diol monomers. The dicarboxylic acid (including the carboxylic acid moieties) may be linear or aliphatic (e.g., oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid and naphthalic acid). Specific examples of a useful diol include but are not limited to ethylene glycol, propylene glycol, trimethylene glycol, 1,4-butane diol, neopentyl glycol, cyclohexane diol, 2,2,4,4-tetramethyl-1,3-cyclobutanediol, and the like. Polyesters may include a homopolymer or copolymer of alkyl-aromatic esters, including but not limited to polyethylene terephthalate (PET), oriented polyethylene terephthalate (OPET), amorphous polyethylene terephthalate (APET), glycol-modified polyethylene terephthalate (PETG), and polybutylene terephthalate (PBT); a copolymer of terephthalate and isophthalate including but not limited to polyethylene terephthalatelisophthalate copolymer, such as isophthalic acid (IPA) (modified polyethylene terephthalate (PETI)); a homopolymer or copolymer of aliphatic esters including but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials. Specific non-limiting examples of OPET are Skyrol® SP93C and Skyrol® SP65 (each available from SKC, Inc. (Covington, Ga.)) and MYLAR® LBT 2 (available from DuPont Teijin Films (Chester, Va.)). Specific non-limiting examples of APET are 10-mil (254-micron) APET sheet, 14-mil (356-micron) APET sheet, and 20-mil (508-micron) APET sheet (each available from Hip Lik Packaging Products Ltd. (HLP Packaging) (New York, N.Y.)). Further specific non-limiting examples of APET are certain grade of temperature-resistant APET.

As used throughout this application, "polyvinyl chloride" or "PVC" refers to a homopolymer or copolymer having at least one vinyl chloride monomer linkage within the repeating backbone of the polymer. The vinyl chloride linkage may be represented by the general formula $[CH_2-CHCl]_n$. Polyvinyl chloride includes but is not limited to copolymers that contain at least 50% by weight vinyl chloride. Specific non-limiting examples of PVC are 10-mil (254-micron) PVC sheet, 14-mil (356-micron) PVC sheet, and 16-mil (406-micron) PVC sheet (each available from Hip Lik Packaging Products Ltd. (HLP Packaging) (New York, N.Y.)).

As used throughout this application, "ionomer" refers to ionic copolymers formed from an olefin and an ethylenically unsaturated monocarboxylic acid having the carboxylic acid moieties partially or completely neutralized by a metal ion. Suitable metal ions may include, but are not limited to, sodium, potassium, lithium cesium, nickel, and zinc. Suitable carboxylic acid comonomers may include, but are not limited to, ethylene acid copolymers, such as, ethylene methacrylic acid, methylene succinic acid, maleic anhydride, vinyl acetate methacrylic acid, methyl methacrylate methacrylic acid, styrene methacrylic acid, and blends of such. Useful ionomer ethylene/acid copolymer resins may include an olefinic content of at least 50 mole percent based upon the copolymer and a carboxylic acid content of from 5 to 25 mole percent based upon the copolymer. A specific non-limiting example of ionomer is DuPont™ Surlyn® 1601-2 (available from E.I. du Pont de Nemours and Company, Inc. (Wilmington, Del.)).

The various embodiments of the pouch described in the present application may package food and non-food items. Such food items include but are not limited to dry goods (such as oatmeal, pasta, etc.), frozen foods (such as vegetables, appetizers, entrées, etc.), soups, and other microwaveable items. As packaged and transported, the pouch has a relatively flat shape and lays flat. In use (as packaged or with the addition of a liquid such as water) and upon exposure to elevated temperatures, the pouch changes from a lay flat or flexible collapsible configuration and self-forms into a stable, formed, "stand-up" configuration which resists collapsing upon itself and/or returning to its former configuration under ambient conditions while providing a stable roomy compartment for the package contents.

Figure 2:
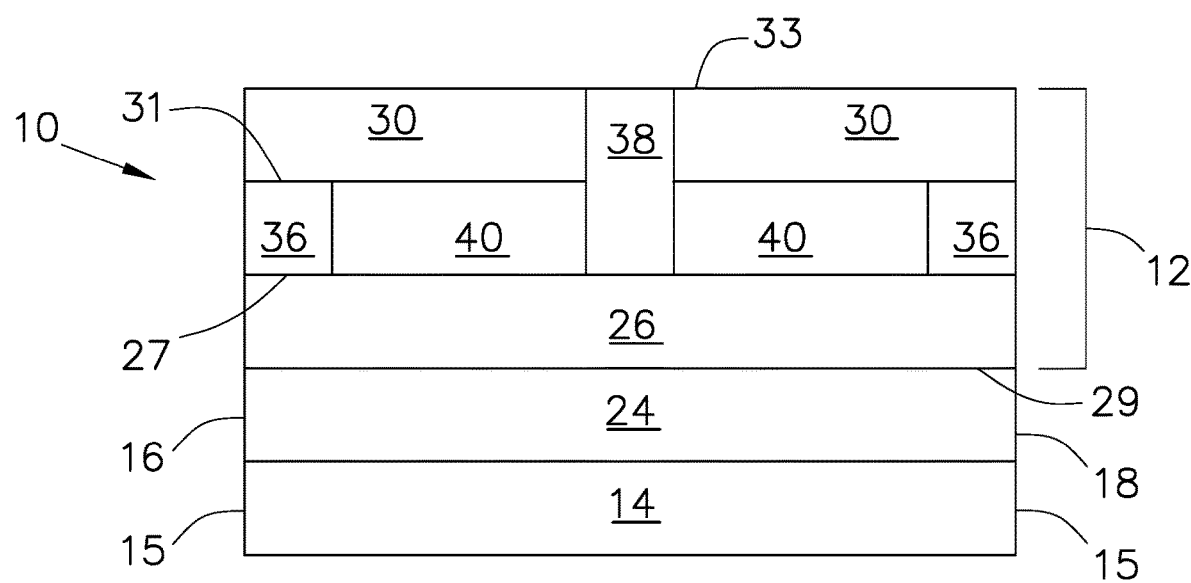
FIG. 2 is a schematic cross-sectional view of the pouch of FIG. 1, taken along line 2-2.

Referring now to the drawings, with some but not all embodiments shown, with elements depicted as illustrative and not necessarily to scale, and with the same (or similar) reference numbers denoting the same (or similar) features throughout the drawings, FIG. 1 is a schematic top view of a first embodiment of a pouch according to the present application. FIG. 2 is a schematic cross-sectional view of the pouch of FIG. 1, taken along the line 2-2. Pouch 10 depicted is a filled, unopened pouch with an up-turned corner. Pouch 10 comprises perimeter 15 comprising first edge 16, second edge 18 opposing first edge 16, third edge 20 substantially perpendicular to first edge 16 and second edge 18, and fourth edge 22 opposing third edge 20. Pouch 10 further comprises first wall 12 and second wall 14. FIG. 1 depicts first wall 12 facing out. Pouch 10 with perimeter 15, first wall 12 and second wall 14 is configured to fully enclose product space 24.

The configuration for pouch 10 may be any one of a variety known in the art. Possible pouch configurations include but are not limited to horizontal-form-fill-seal, vertical form-fill-seal, lap-seal, fin-seal, mid-seal, four-side-seal, quad-seal, three-side-seal, quad pack, stand-up, K-seal, doyen, corner bottom, side-gusset, mid-seal side gusset, pillow, stick pack, zipper (or other reseal), sachet, or other pouch configurations known in the art. With the various pouch configurations, first edge 16, second edge 18, third edge 20 and fourth edge 22 may take various forms. Such forms include but are not limited to a seal (e.g., an ultrasonic seal, a heat seal, an impulse seal, a pressure seal or other seal known in the art) connecting first wall 12 and second wall 14, a fold between and connecting first wall 12 and second wall 14, a gusset member formed or plowed in a fold between and connecting first wall 12 and second wall 14, a gusset member inserted and sealed between and connecting first wall 12 and second wall 14, other sealing or connecting forms or means known in the art, or combinations of the above.

FIGS. 1 and 2 provide further details of first wall 12 (and, in fact, each first wall of the present application). As depicted in FIG. 2, first wall 12 comprises first wall first layer 26 and first wall second layer 30. First wall first layer 26 has inner surface 27 and outer surface 29; first wall second layer 30 has inner surface 31 and outer surface 33. First wall first layer 26 is interior first wall second layer 30 in that it is closer to the innermost surface of pouch 10, such as, in this embodiment, the surface in direct contact with product space 24. In the embodiment of FIGS. 1 and 2, first wall first layer 26 is an interior layer of pouch 10, and first wall second layer 30 is an exterior layer of pouch 10. However, in other embodiments, as long as first wall first layer 26 remains interior first wall second layer 30, an additional layer or layers may be between first wall first layer 26 and product space 24, and an additional layer or layers may be between first wall second layer 30 and the exterior surface of pouch 10.

First wall first layer 26 has a machine direction shrinkage value of greater than 5% shrink at 90° C. In various embodiments, first wall first layer 26 may have a machine direction shrinkage value of from greater than 5% to 70% shrink at 90° C. or at least 10% shrink at 90° C. or at least 20% shrink at 90° C. or from 10% to 50% shrink at 90° C. Machine direction is in a direction from first edge 16 to second edge 18.

In some embodiments, first wall first layer 26 may also have a transverse direction shrinkage value of greater than 5% shrink at 90° C. In other embodiments, first wall first layer 26 may have a transverse direction shrinkage of less than 5% shrink at 90° C. (and, therefore, have essentially no heat shrink in the transverse direction).

First wall first layer 26 may comprise polypropylene, polyethylene, polyamide, polyester, polystyrene, cyclic olefin copolymer, ethylene vinyl-alcohol copolymer, polyvinylidene chloride, ionomer, or blends of such. In some embodiments, first wall first layer 26 may comprise polypropylene, polyethylene, polyamide, cyclic olefin copolymer, or blends of such. In some embodiments, first wall first layer 26 may be a multilayer film. Further specific non-limiting examples of the composition of first wall first layer 26 are described in the Examples section below.

First wall second layer 30 has a machine direction shrinkage value at 90° C. of less than the machine direction shrinkage value of first wall first layer 26 at 90° C. First wall second layer 30 also has a machine direction Gurley stiffness force of at least 800 mgf. In various embodiments, first wall second layer may have a machine direction Gurley stiffness force of from 800 mgf to 12.000 mgf or from 800 to 5,500 mgf or from 1,200 mgf to 10,400 mgf or at least 2,000 mgf. Again, machine direction is in a direction from first edge 16 to second edge 18.

In some embodiments, first wall second layer 30 may have a thickness of from 10 mil (254 micron) to 20 mil (508 micron). In other embodiments, first wall second layer 30 may have a thickness of from 12 mil (305 micron) to 16 mil (406 micron).

First wall second layer 30 may comprise paperboard, nonwoven, polypropylene, polyethylene, polyamide, polyester, polystyrene, cyclic olefin copolymer, polyvinyl chloride, ionomer, or blends of such. In some embodiments, first wall second layer 30 may comprise paperboard, polypropylene, polyester, polystyrene, or blends of such. In some embodiments, first wall second layer 30 may be a multilayer film. Further specific non-limiting examples of the composition of first wall second layer 30 are described in the Examples section below.

As depicted in FIGS. 1 and 2, first wall 12 further comprises first wall pattern connection 36. In some embodiments (such as that depicted in FIGS. 1 and 2), first wall pattern connection 36 may be between first wall first layer 26 and first wall second layer 30. First wall pattern connection 36 includes only portions of the area, but not the entire area, between first wall first layer 26 and first wall second layer 30. As such, first wall 12 further comprises first wall void 40 between first wall first layer 26 and first wall second layer 30. First wall pattern connection 36 may be in the form of, for example, a pattern seal (e.g., a heat, impulse, ultrasonic, pressure or other seal) attaching only portions of first wall first layer 26 and first wall second layer 30 or in the form of a pattern connecting layer (e.g., adhesive applied in a pattern or in register to only portions of the area) between first wall first layer 26 and first wall second layer 30. For example, first wall pattern connection 36 may be an adhesive pattern-applied to the area adjacent perimeter 15 between first wall first layer 26 and first wall second layer 30.

In other embodiments, first wall first layer 26 may be a multilayer film and first wall pattern connection 36 may in first wall first layer 26. Such first wall pattern connection 36 may be in the form of, for example, a pattern seal between adjacent layers of first wall first layer 26 or a pattern connecting layer between adjacent layers of first wall first layer 26.

In yet other embodiments, first wall second layer 30 may be a multilayer film and first wall pattern connection 36 may be in first wall second layer 30. Such first wall pattern connection may be in the form of, for example, a pattern seal between adjacent layers of first wall second layer 30 or a pattern connecting layer between adjacent layers of first wall second layer 30.

First wall 12 also comprises first wall air inlet 38. First wall air inlet 38 may be in the form of one or more than one hole, vent, slit, slot, perforation, notch, puncture, orifice, opening, gap, channel, score, or other means to allow fluid (i.e., gas or liquid) into void 40 between first wall first layer 26 and first wall second layer 30. As depicted in FIGS. 1 and 2, first wall air inlet 38 is a hole through the first wall second layer 30. In other embodiments, first wall air inlet 38 may be a hole through first wall first layer 26. In still other embodiments, first wall air inlet 38 may be a hole adjacent perimeter 15 in first wall pattern connection 36 between first wall first layer 26 and first wall second layer 30 (see, e.g., FIGS. 5 and 6 further described below).

Upon exposure to elevated temperatures (i.e. greater than ambient room temperature (23° C.), such as greater than 60° C., greater than 70° C., greater than 80° C., or greater than 90° C.), the heat-shrinkage properties of first wall first layer 26 are activated. Therefore, in some embodiments, due to the heat-shrinkage properties of first wall first layer 26, pouch 10 may be free of a susceptor shrink material in direct contact with first wall first layer 26. First wall pattern attachment 36 allows for the creation of shrink forces in first wall first layer 26 which cause first wall first wall first layer 26 to pull away from first wall second layer 30. The shrink forces also cause first wall first layer 26 to pull first wall second layer 30. This causes first wall second layer 30 to bend. As such, as depicted in FIG. 1, first wall 12 may comprise first bending point 74, second bending point 76, third bending point 78 and/or a fourth bending point (not specifically depicted). First bending point 74, second bending point 76, third bending point 78 and the fourth bending point may be a weakness in first wall 12 or, more specifically first wall second layer 30, to facilitate first wall second layer 30 bending or become "rounded" or otherwise shaped as first wall first layer 26 pulls away from and pulls first wall second layer 30. Such weakness may be in the form of a partial interruption (i.e., a continuous or non-continuous series of holes, vents, slits, slots, perforations, notches, punctures, orifices, openings, gaps, channels, score, etc.) in first wall second layer 30. Such partial interruption may be formed by mechanical means (e.g., using a cutting blade), by chemical means (e.g., using solvents), by thermal means (e.g., by optical ablation), by electronic means (e.g., radio frequency creasing), or by other means known in the art.

First wall air inlet 38 allows fluid (i.e., gas or liquid) to enter void 40 between first wall first layer 26 and first wall second layer 30. This creates an insulating effect. Upon activation of the heat-shrinkage properties of first wall first layer 26, a vacuum may be created between first wall first layer 26 and first wall second layer 30. Therefore, in some embodiments, void 40 may comprise moisture-absorbing or other absorbing materials or may comprise fragrance, sauces, condiments, or other materials that are released upon creation of the vacuum.

Figure 3:
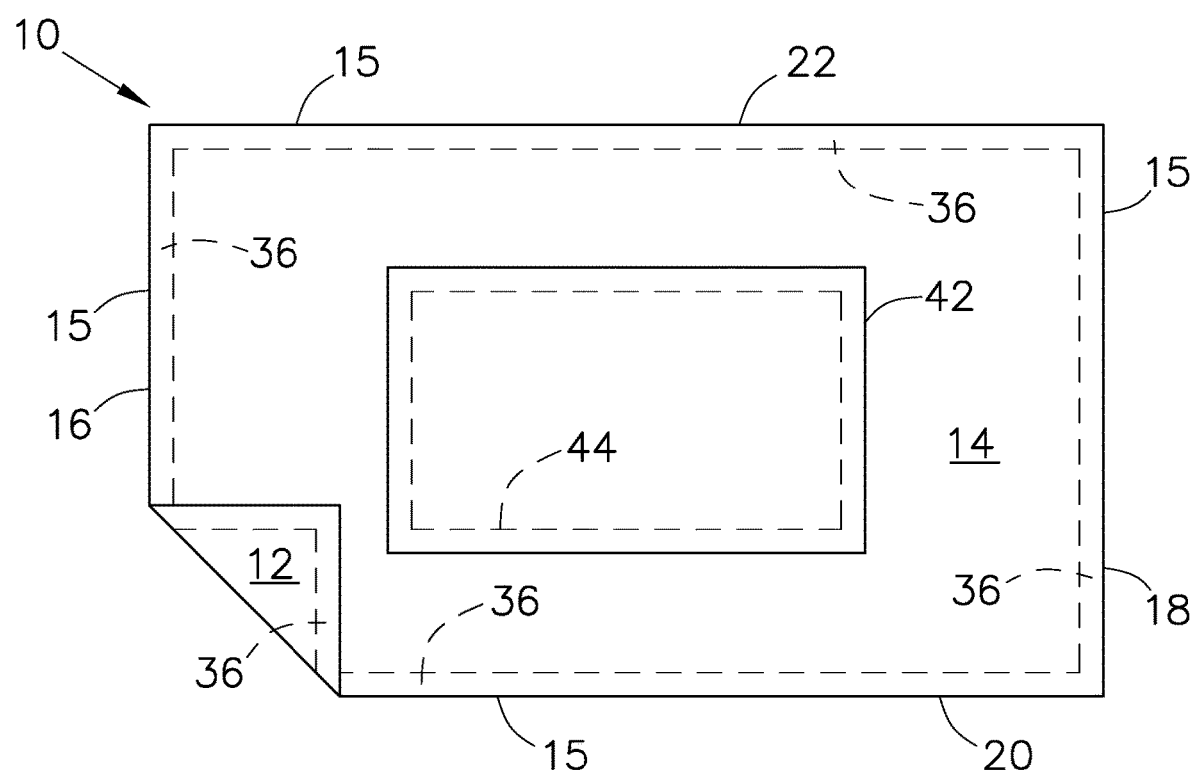
FIG. 3 is a schematic bottom view of the pouch of FIG. 1.

FIG. 3 is a schematic bottom view of the pouch of FIG. 1. FIG. 3 depicts second wall 14 facing out and is simply the "bottom side" of pouch 10 of FIG. 1 with perimeter 15 comprising first edge 16, second edge 18 opposing first edge 16, third edge 20 substantially perpendicular to first edge 16 and second edge 18, and fourth edge 22 opposing third edge 20; first wall 12; second wall 14; and first wall pattern connection 36.

As depicted in FIG. 3, pouch 10 may comprise an opening mechanism to access product space 24. This opening mechanism may be in second wall 14 and may comprise label 42 placed over scored opening 44. In other embodiments, the opening mechanism may be a fully-integrated die-cut label. Additional specific non-limiting examples of further opening mechanisms for pouch 10 are described below.

Figure 4:
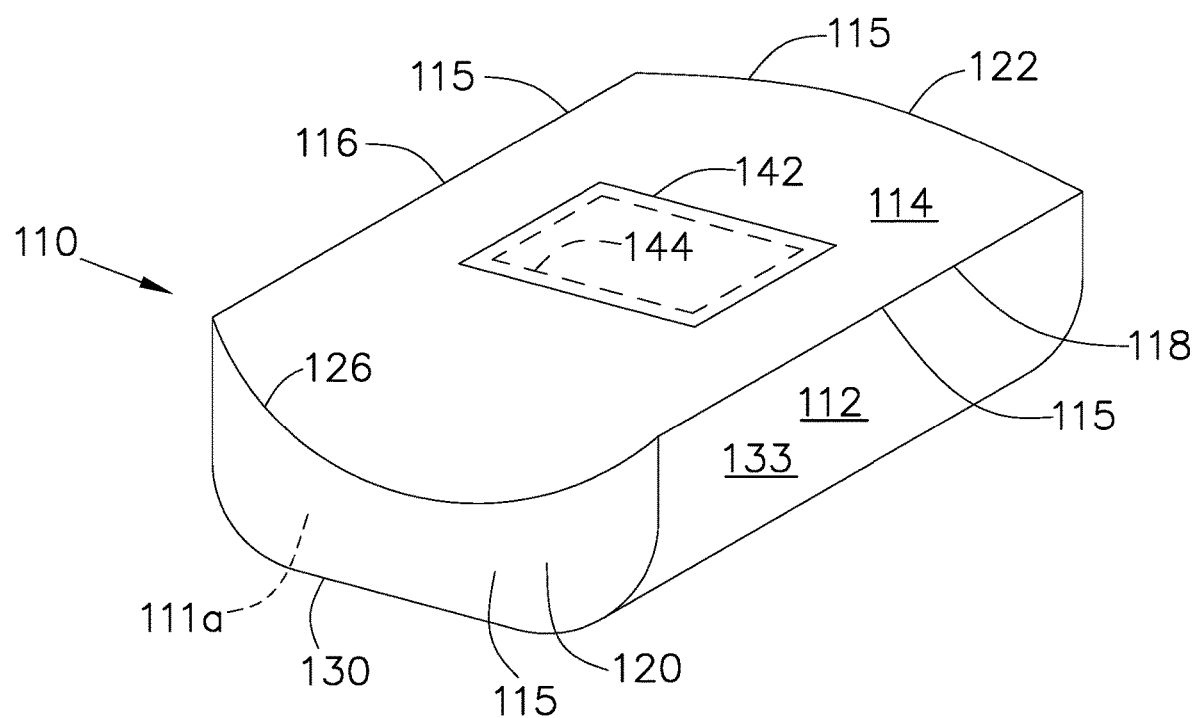
FIG. 4 is a perspective view of the pouch of FIG. 3 upon exposure to elevated temperatures.

FIG. 4 is a perspective view of the pouch of FIG. 3 upon exposure to elevated temperatures. Pouch 110 comprises perimeter 115 comprising first edge 116, second edge 118 opposing first edge 116, third edge 120 substantially perpendicular to first edge 116 and second edge 118, and fourth edge 122 opposing third edge 120. Pouch 110 further comprise first wall 112 with first wall second layer 130 (having outer surface 133) and second wall 114. Second wall 114 comprises label 142 placed over scored opening 144.

FIG. 4 depicts the result of the activation of the heat-shrinkage properties of first wall first layer 126. As described above, with exposure to elevated temperatures, first wall first layer 126 pulls away from and pulls first wall second layer 130. This causes first wall second layer 130 to bend slightly. As a result, pouch 110 resembles a tray. First wall space 111a created between first wall first layer 126 and first wall second layer 130 provides an insulating effect, such that a user may comfortable touch and/or hold outer surface 133 of first wall second layer 130 (i.e., in this embodiment, first wall 112).

In some embodiments, second wall 14 may comprise paperboard, nonwoven, polypropylene, polyethylene, polyamide, polyester, polystyrene, cyclic olefin copolymer, ethylene vinyl-alcohol copolymer, polyvinylidene chloride, polyvinyl chloride, ionomer, or blends of such. In other embodiments, the composition of second wall 14 may be similar to the composition of first wall first layer 26. In such embodiments, second wall 14 may or may not be oriented and may or may have heat-shrink properties. As a non-limiting example, in some embodiments, second wall 14 may be a VSP (vacuum skin packaging) film. A specific non-limiting example of a VSP film is a multilayer film having the following structure: EVA+processing aids/ionomer/EVA+tie/EVOH/EVA+tie/ionomer/LLDPE+processing aids. (The use of "/" P denotes the boundary between layers.)

In some embodiments, second wall 14 may have a similar structure to first wall 12 in that second wall 14 may also comprise a second wall first layer, a second wall second layer, a second wall pattern connection, and a second wall air inlet. The second wall first layer may have properties and composition generally similar, but not necessarily specifically identical, to the first wall first layer described above. As a non-limiting example, the second wall first layer may have a machine direction shrinkage value of greater than 5% at 90° C. but may have a machine direction shrinkage value at 90° C. of less than the first wall first layer. The second wall second layer may have properties and composition generally similar, but not specifically identical, to the first wall second layer described above. As a non-limiting example, the second wall second layer may comprise polyester while the first wall second layer may comprise paperboard. The second wall pattern connection may have properties generally similar, but not specifically identical, to the first wall pattern connection described above. As a non-limiting example, the second wall pattern connection may be within the second wall first layer as a multilayer film while the first wall pattern connection may be in the form of a pattern connecting layer between the first wall first layer and the first wall second layer. The second wall air inlet may have properties generally similar, but not necessarily identical, to the first wall air inlet described above. As a non-limiting example, the second wall air inlet may comprise a hole through the second wall first layer while the first wall air inlet may comprise a hole through the first wall second layer. Also, in some embodiments, due to the heat-shrinkage properties of the second wall first layer, the pouch may be may free of a susceptor shrink material indirect contact with the second wall first layer.

Figure 5:
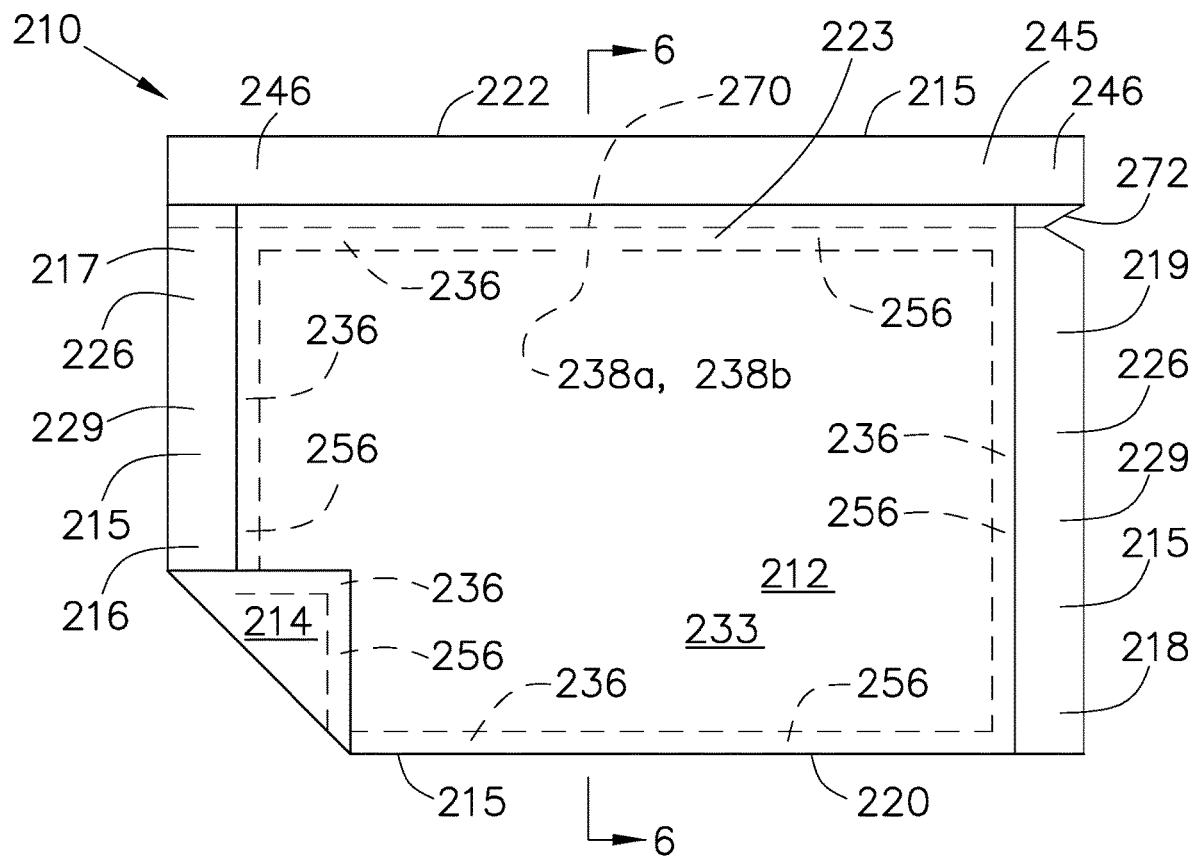
FIG. 5 is a schematic top view of a second embodiment of a pouch according to the present application.
Figure 6:
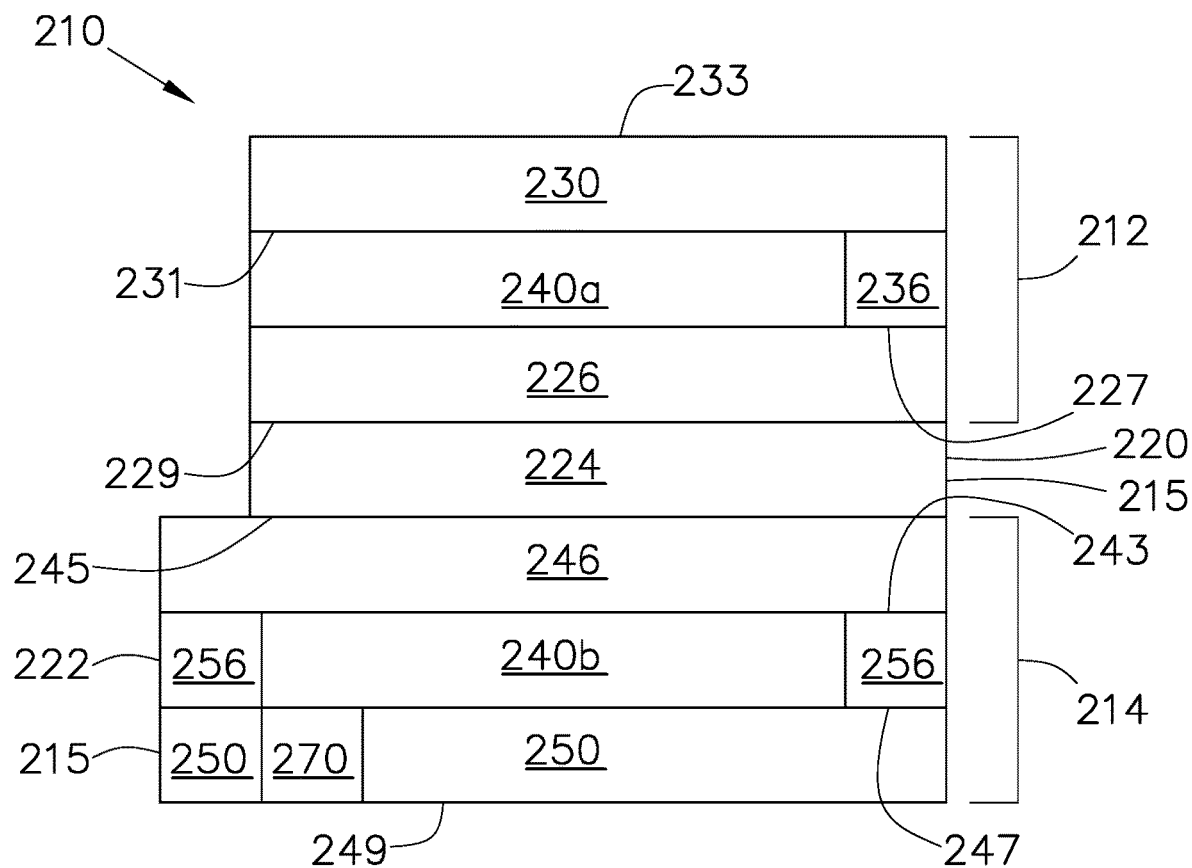
FIG. 6 is a schematic cross-sectional view of the pouch of FIG. 1, taken along line 6-6.

FIGS. 5 and 6 provide additional details regarding embodiments in which second wall 14 has a similar structure to first wall 12. FIG. 5 is a schematic top view of a second embodiment of a pouch according to the present application. FIG. 6 is a schematic cross-sectional view of the pouch of FIG. 5, taken along the line 6-6. Pouch 210 depicted is a filled, unopened pouch with an up-turned corner. Pouch 210 comprises perimeter 215 comprising first edge 216, second edge 218 opposing first edge 216, third edge 220 substantially perpendicular to first edge 216 and second edge 218, and fourth edge 222 opposing third edge 220. Pouch 210 further comprises first wall 212 and second wall 214. Pouch 210 with perimeter 215, first wall 212 and second wall 214 is configured to fully enclose product space 224.

First wall 212 comprises first wall first layer 226 and first wall second layer 230. First wall first layer 226 has inner surface 227 and outer surface 229; first wall second layer 230 has inner surface 231 and outer surface 233. First wall first layer 226 is interior first wall second layer 230 in that it is closer to the interior surface of pouch 210, in this embodiment, the surface in direct contact with product space 224. In the embodiment of FIGS. 5 and 6, first wall first layer 226 is an interior layer of pouch 210, and first wall second layer 230 is an exterior layer of pouch 210.

As depicted in FIGS. 5 and 6, first wall 212 further comprises first wall pattern connection 236. In the embodiment of FIGS. 5 and 6, first wall pattern connection 236 is between first wall first layer 226 and first wall second layer 230. First wall pattern connection 236 includes only portions of the area, but not the entire area, between first wall first layer 226 and first wall second layer 230. As such, first wall 212 further comprises first wall void 240a between first wall first layer 226 and first wall second layer 230.

First wall 212 also comprises first wall air inlet 238a. In the embodiment of FIGS. 5 and 6, first wall air inlet 238a is in the form of a hole that allows fluid (i.e., gas or liquid) into first wall void 240a between first wall first layer 226 and first wall second layer 230. Specifically, in this embodiment, first wall air inlet 238a is a hole adjacent perimeter 215 in first wall patter connection 236 between first wall first layer 226 and first wall second layer 230.

Second wall 214 comprises second wall first layer 246 and second wall second layer 250. Second wall first layer 246 has inner surface 243 and outer surface 245; second wall second layer 250 has inner surface 247 and outer surface 249. Second wall first layer 246 is interior second wall second layer 250 in that it is closer to the interior surface of pouch 210, in this embodiment, the surface in direct contact with product space 224. In the embodiment of FIGS. 5 and 6, second wall first layer 246 is an interior layer of pouch 210, and second wall second layer 250 is an exterior layer of pouch 210.

As depicted in FIGS. 5 and 6, second wall 214 further comprises second wall pattern connection 256. In the embodiment of FIGS. 5 and 6, second wall pattern connection 256 is between second wall first layer 246 and second wall second layer 250. Second wall pattern connection 256 includes only portions of the area, but not the entire area, between second wall first layer 246 and second wall second layer 250. As such, second wall 214 further comprises second wall void 240b between second wall first layer 246 and second wall second layer 250.

Second wall 214 also comprises second wall air inlet 238b. In the embodiment of FIGS. 5 and 6, second wall air inlet 238b is in the form of a hole that allows fluid (i.e., gas or liquid) into second wall void 240b between second wall first layer 246 and second wall second layer 250. Specifically, in this embodiment, second wall air inlet 238b is a hole adjacent perimeter 215 in second wall pattern connection 256 between second wall first layer 246 and second wall second layer 250.

In the embodiment of FIGS. 5 and 6, first wall pattern connection 236 is superimposed on second wall pattern connection 256, and first wall air inlet 238a is superimposed on second wall air inlet 238b.

Also in the embodiment of FIGS. 5 and 6, first wall second layer 230 is not coextensive with first wall first layer 226 or with second wall first layer 246 or with second wall second layer 250. In other words, the width (i.e., the distance from first edge 216 to second edge 218) of first wall second layer 230 is less than the width of first wall first layer 226 and second wall first layer 246 and second wall second layer 250. In the embodiment of FIGS. 5 and 6, first wall first layer 226, second wall first layer 246 and second wall second layer 250 are coextensive. In other words, the widths of first wall first layer 226, second wall first layer 246, and second wall second layer 250 are substantially equal. In the embodiment of FIGS. 5 and 6, the height (i.e., the distance from third edge 220 to fourth edge 222) of first wall 212 is less than the height of second wall 214. As such, a portion of second wall 214 is "above" first wall 212.

As depicted in FIG. 5, first edge 216 of pouch 210 comprises first seal 217, and second edge 218 comprises second seal 219. Due to the non-coextensiveness described above, each of first seal 217 and second seal 219 comprises first wall first layer 226 (having outer surface 229), second wall first layer 246 (having outer surface 245), and second wall second layer 250, but not first wall second layer 230 (having outer surface 233).

Pouch 210 of FIGS. 5 and 6 also comprises an opening mechanism in the form of score 270 in second wall second layer 250. (As used throughout this application, a "score" refers to a continuous or non-continuous series of holes, vents, slits, slots, perforations, notches, punctures, orifices, openings, inlets, channels, etc., in the surface of or through a layer.) Score 270 is located adjacent fourth edge 222. Tear notch 272 may assist in the removal of the portion of second wall 214 "above" first wall 212 and in the opening of fourth seal 223 (which seals first wall first layer 226 to second wall first layer 246 adjacent fourth edge 222) to allow access to product space 224. Opening fourth seal 223 exposes first wall air inlet 238a and second wall air inlet 238b. In other embodiments (not depicted), the first wall (including the first wall first layer and the first wall second layer) may have the same height as the second wall (including the second wall first layer and the second wall second layer), and each of first wall second layer and second wall second layer may be scored to provide an opening mechanism. In yet other embodiments, the first wall (including the first wall first layer and the first wall second layer) may have the same height as the second wall (including second wall first layer and second wall second layer), but a corner of each of the first wall second layer and the second wall second layer may be removed to allow access to an opening mechanism (such as a score) across each of the first wall first layer and the first wall second layer.

Figure 7:
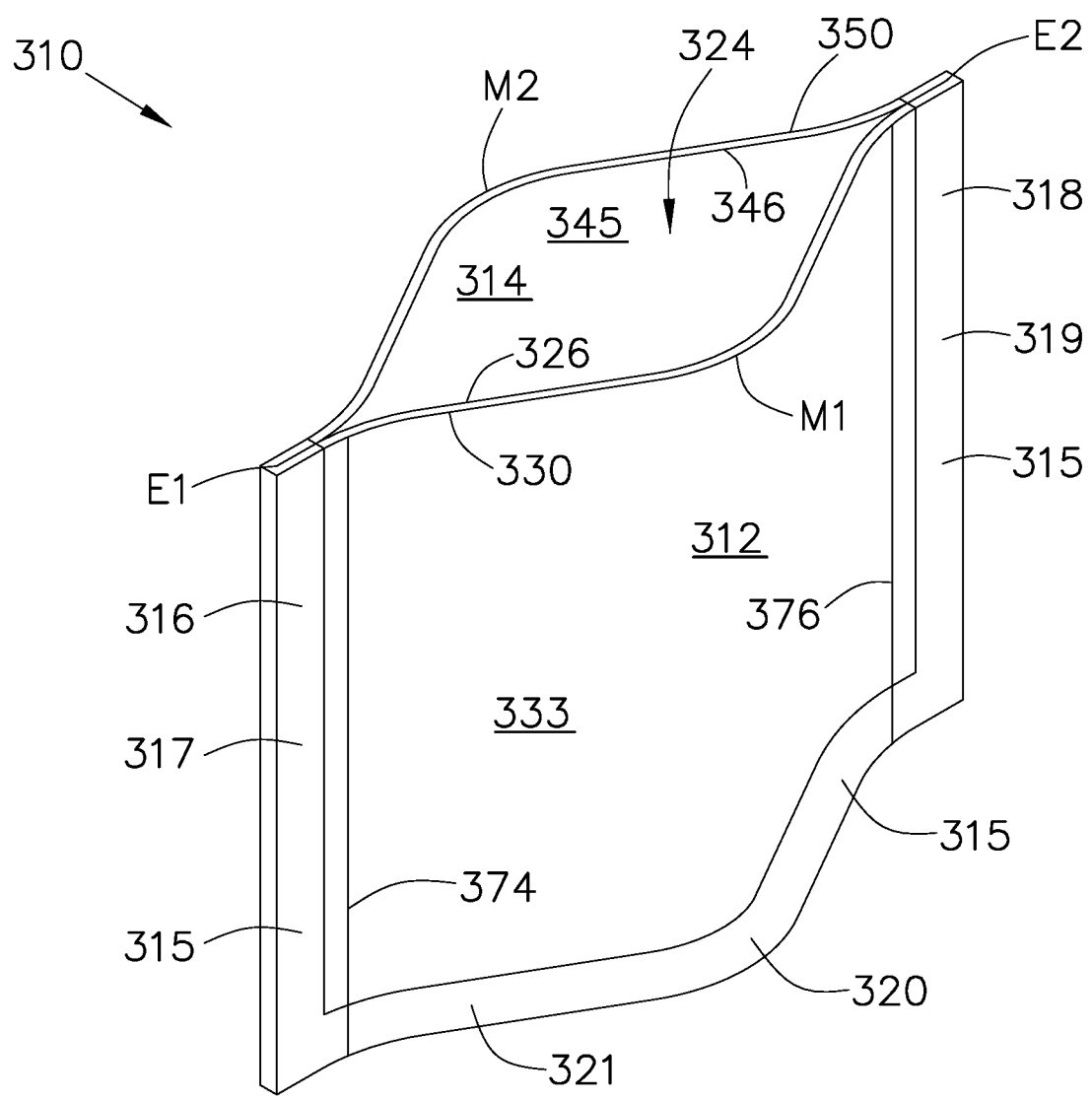
FIG. 7 is a perspective view of a third embodiment of a pouch according to the present application.
Figure 8:
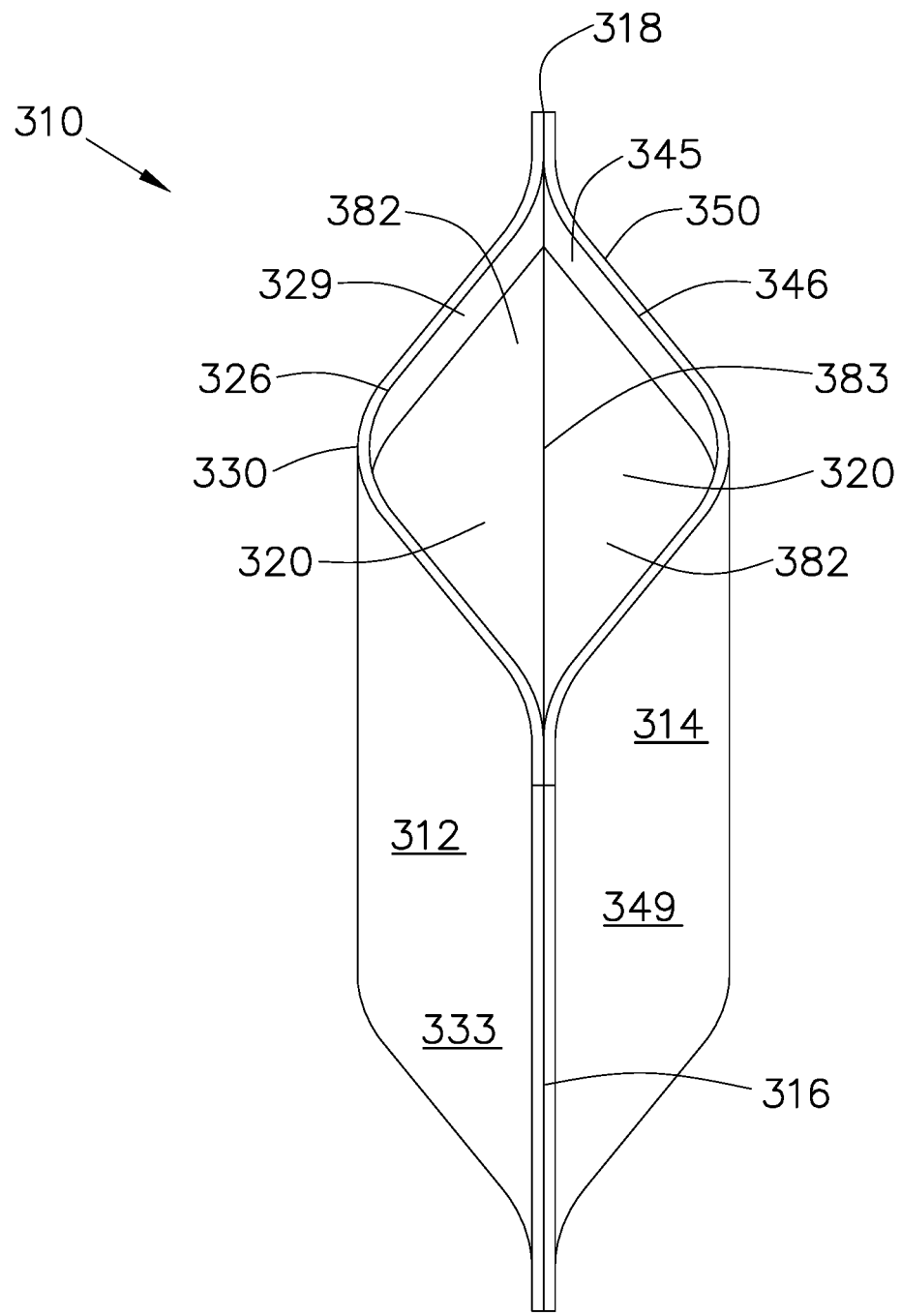
FIG. 8 is a perspective bottom view of the pouch of FIG. 7.

FIG. 7 is a perspective view of a third embodiment of a pouch according to the present application. FIG. 8 is a perspective bottom view of the pouch of FIG. 7. Pouch 310 comprises perimeter 315 comprising first edge 316, second edge 318 opposing first edge 316, and third edge 320 substantially perpendicular to first edge 316 and second edge 318. Pouch 310 is depicted in an open state and, as such, the fourth edge opposing third edge 320 is not enumerated. Pouch 310 further comprises first wall 312 and second wall 314. Though depicted in an open state, pouch 310 with perimeter 315, first wall 312 and second wall 314 is configured to fully enclose product space 324.

First wall 312 comprises first wall first layer 326 and first wall second layer 330. First wall first layer 326 has an inner surface (not specifically enumerated) and outer surface 329; first wall second layer 330 has an inner surface (not specifically enumerated) and outer surface 333. Second wall 314 comprises a second wall first layer 346 and a second wall second layer 350. Second wall first layer 346 has an inner surface (not specifically enumerated) and outer surface 345; second wall second layer 350 has an inner surface (not specifically enumerated) and outer surface 349. Though not depicted for simplicity's sake, first wall 312 also comprises a first wall pattern connection and a first wall air inlet, and second wall 314 also comprises a second wall pattern connection and a second wall air inlet. Such pattern connections and air inlets are as described above.

In the embodiment of FIGS. 7 and 8, first wall second layer 330 is coextensive with second wall second layer 350 (and with first wall first layer 326 and with second wall first layer 346). In other words, the widths (i.e., the distance from first edge 316 to second edge 318) of first wall second layer 330, second wall second layer 350, first wall first layer 326, and second wall first layer 346 are substantially equal. First edge 316 of pouch 310 comprises first seal 317, and second edge 318 comprises second seal 319. Due to the coextensiveness described above, each of first seal 317 and second seal 319 comprises first wall second layer 330, first wall first layer 326, second wall first layer 346, and second wall second layer 350. To facilitate first wall second layer 330 bending or become "rounded" or otherwise shaped upon exposure of pouch 310 to elevated temperatures, first wall second layer 330 comprises first bending point 374 and second bending point 376.

Third edge 320 of pouch 310 comprises third edge gusset member 382. In some embodiments, third edge gusset member 382 may be formed in a fold between and connecting first wall 312 and second wall 314 (e.g., first wall first layer 326 extending from first wall 312 to second wall 314, and first wall first layer 326 being identical to second wall first layer 346). In other embodiments, and as depicted in FIGS. 7 and 8, third edge gusset member 382 is inserted and sealed between and connecting first wall 312 and second wall 314. Specifically, third seal 321 at third edge 320 seals third edge gusset member 382 to each of first wall first layer 326 and second wall first layer 346. Third seal 321 may be doyen, K-seal, corner bottom, or otherwise as known in the art. Third edge gusset member 382 comprises gusset member fold 383.

In some embodiments, the composition of third wall gusset member 382 may be chosen to facilitate sealing to first wall first layer 326 and/or second wall first layer 346. As such, the composition of third wall gusset member 382 may be similar to the composition of first wall first layer 326 and/or second wall first layer 346. In such embodiments, third wall gusset member 382 may or may not be oriented and may or may have heat-shrink properties. Third edge gusset member 382 may comprise a material having a machine direction shrinkage value of from 0% shrink to 70% shrink at 90° C. In some embodiments, third edge gusset member 382 may have a machine direction shrinkage of from 0% shrink to 5% shrink at 90° C. (and, therefore, have essentially no heat shrink in the machine direction). In other various embodiments, third edge gusset member 382 may have a machine direction shrinkage value of from 15% to 70% shrink at 90° C. or of greater than the machine direction shrinkage value of first wall first layer 326 and/or second wall first layer 346 at 90° C. As above, machine direction is in a direction from first edge 16 to second edge 18. In some embodiments, third edge gusset member 382 may also have a transverse direction shrinkage value of greater than 5% shrink at 90° C. In other embodiments, third edge gusset member 382 may have a transverse direction shrinkage of less than 5% shrink at 90° C. (and, therefore, have essentially no heat shrink in the transverse direction). Third edge gusset member 382 may have a v-fold, a w-fold, or otherwise as known in the art.

Figure 9:
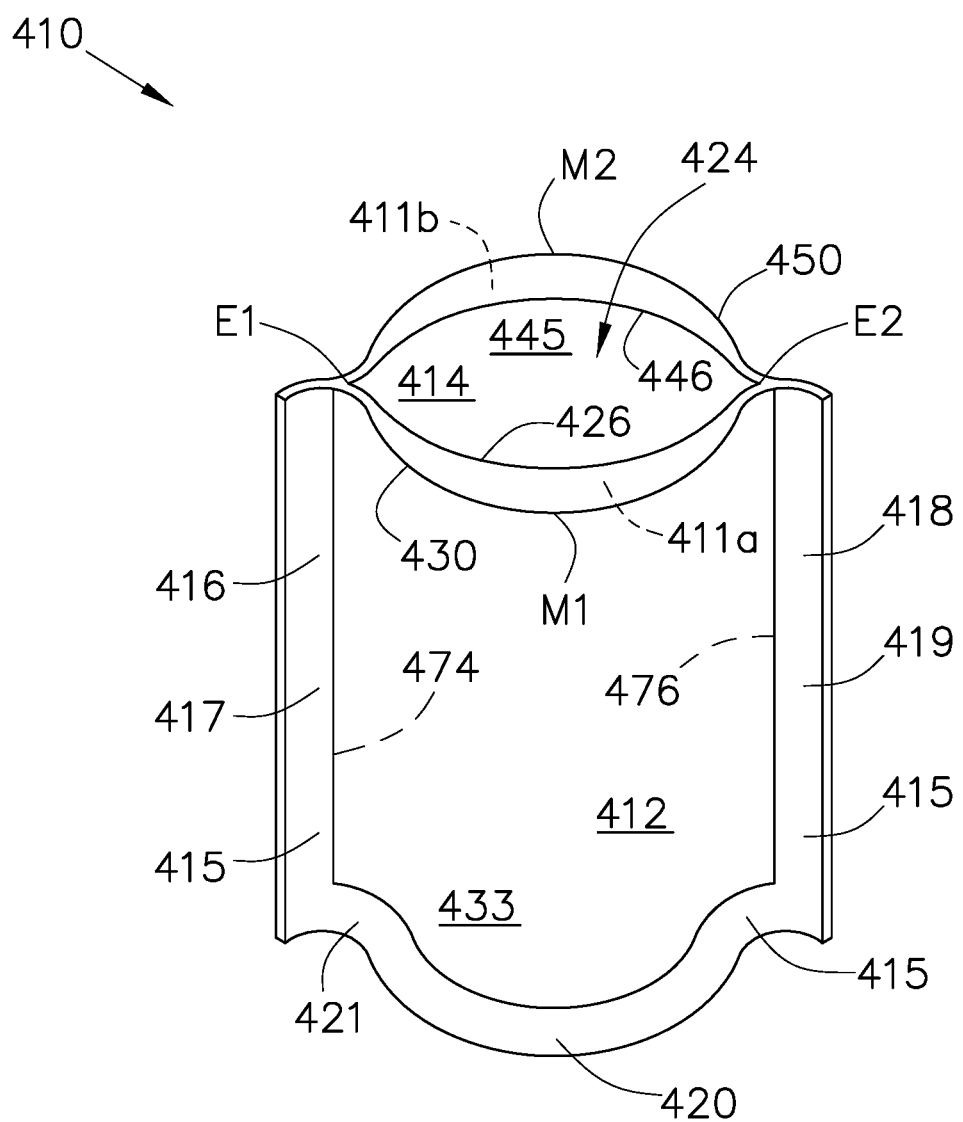
FIG. 9 is a perspective view of the pouch of FIG. 7 upon exposure to elevated temperatures.

FIG. 9 is a perspective view of the pouch of FIG. 7 upon exposure to elevated temperatures. Pouch 410 comprises perimeter 415 comprising first edge 416, second edge 418 opposing first edge 416, and third edge 420 substantially perpendicular to first edge 416 and second edge 418. As above, pouch 410 is depicted in an open state and, as such, the fourth edge opposing third edge 420 is not enumerated. Pouch 410 further comprises first wall 412 and second wall 414. Though depicted in an open state, pouch 410 with perimeter 415, first wall 412 and second wall 414 is configured to fully enclose product space 424.

First wall 412 comprises first wall first layer 426 and first wall second layer 430. First wall second layer 430 has outer surface 433. Second wall 414 comprises a second wall first layer 446 and a second wall second layer 450. Second wall first layer 446 has outer surface 445. As above, as first wall second layer 430 is coextensive with second wall second layer 450 (and with first wall first layer 426 and with second wall first layer 446), first seal 417 (at first edge 416) and second seal 419 (at second edge 418) each comprises first wall second layer 430, first wall first layer 426, second wall first layer 446, and second wall second layer 450. Third seal 421 at third edge 420 seals third edge gusset member (not specifically enumerated) to each of first wall first layer 426 and second wall first layer 446. Though not depicted for simplicity's sake, first wall 412 also comprises a first wall pattern connection and a first wall air inlet, and second wall 414 also comprises a second wall pattern connection and a second wall air inlet. Such pattern connections and air inlets are as described above.

FIG. 9 depicts the result of the activation of the heat-shrinkage properties of first wall first layer 426 and second wall first layer 446. Upon exposure to elevated temperatures (i.e. greater than ambient room temperature (23° C.), the heat-shrinkage properties of first wall first layer 426 and second wall first layer 446 are activated. Therefore, in some embodiments, due to the heat-shrinkage properties of first wall first layer 426 and second wall first layer 446, pouch 410 may be free of a susceptor shrink material in direct contact with first wall first layer 426 and second wall first layer 446. As described above, with exposure to elevated temperatures, first wall first layer 426 pulls away from and pulls first wall second layer 430. This causes first wall second layer 430 to bend and curve outward. Second wall first layer 446 also pulls away from and pulls second wall second layer 450. This causes second wall second layer 450 to bend and curve outward. First bending point 474 and second bending point 476 facilitate such bending and curving. As a result, pouch 410 resembles a cup, a can, a cylinder, or the like. First wall space 411a created between first wall first layer 426 and first wall second layer 430 and second wall space 411b created between second wall first layer 446 and second wall second layer 450 each provides an insulating effect, such that a user may comfortable touch and/or hold outer surface 433 of first wall second layer 430 (i.e., in this embodiment, first wall 412) and/or the outer surface of second wall second layer 450 (i.e., in this embodiment, second wall 414).

The effect of the exposure to elevated temperatures may be evaluated by the ratio of an edge distance between first edge 316, 416 and second edge 318, 418 to a fourth edge midpoint distance between first wall 312, 412 and second wall 314, 414. The edge distance may be measured between E1 and E2 (as shown in FIGS. 7 and 9), and the fourth edge midpoint distance may be measured between M1 and M2 (as shown in FIGS. 7 and 9). Upon activation of an opening mechanism (i.e., opening of pouch 310, 410) and exposure to elevated temperatures, the edge distance decreases and the fourth edge midpoint distance increases. In other words, upon activation of an opening mechanism and exposure to elevated temperatures, the distance between E1 and E2 in FIG. 9 is less than the distance between E1 and E2 in FIG. 7, and the distance between M1 and M2 in FIG. 9 is greater than the distance between M1 and M2 in FIG. 7. In embodiments in which pouch 310, 410 upon exposure to elevated temperatures might resemble a cup, a can, a cylinder, or the like, an E Distance to M Distance ratio of 0.5 to 1.5 or, optimally, 0.7 to 1.3 or, more optimally, 0.8 to 1.1 may be preferred; an E Distance to M Distance ratio of 1.0 represents a generally circular shaped opening. In other embodiments in which the pouch (as described in the present application) upon exposure to elevated temperatures might resemble a tray or other packaging (such as that depicted in FIG. 4), an E Distance to M Distance ratio may be less applicable.

Figure 10:
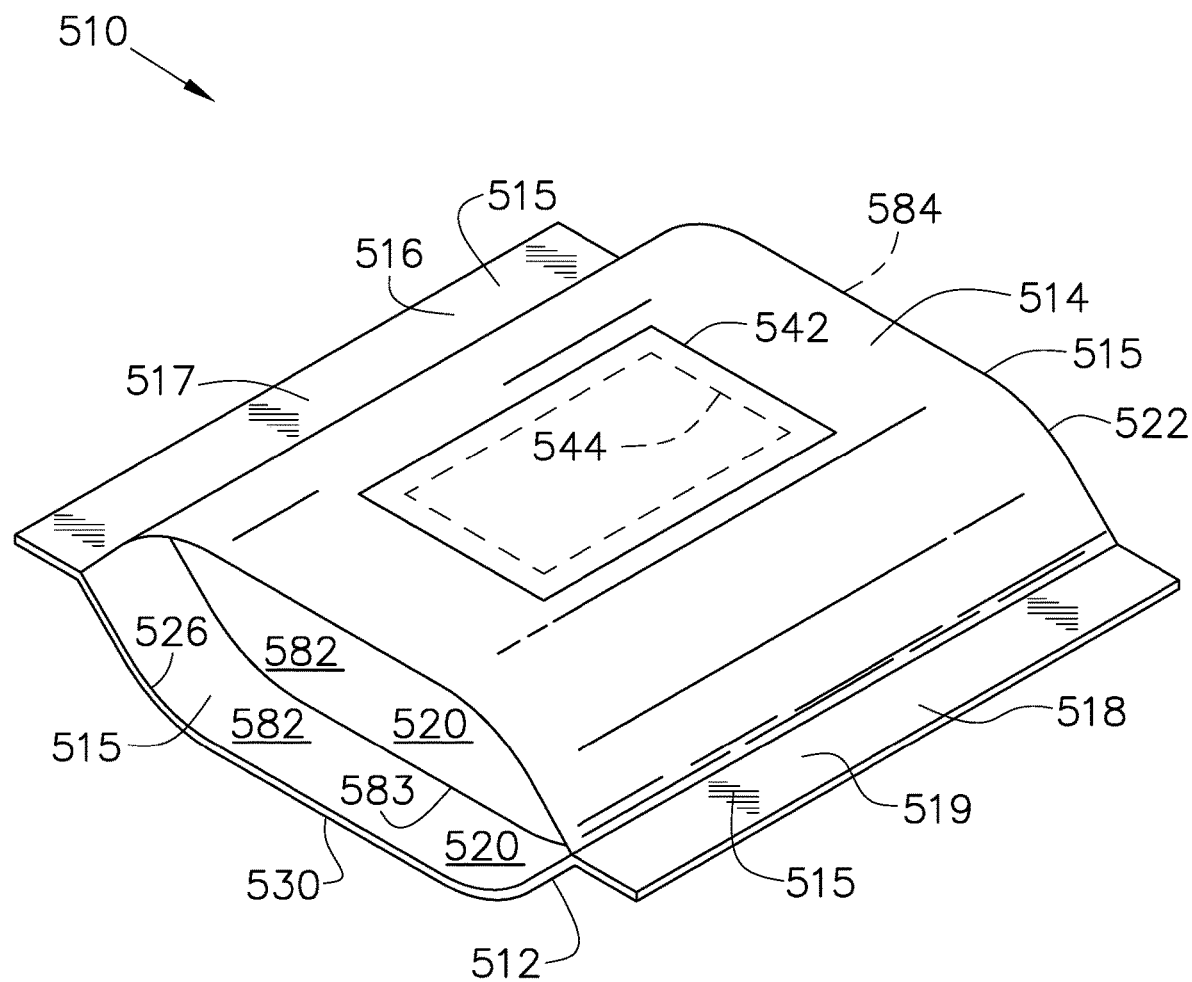
FIG. 10 is a perspective view of a fourth embodiment of a pouch according to the present application.

FIG. 10 is a perspective view of a fourth embodiment of a pouch according to the present application. Pouch 510 comprises perimeter 515 comprising first edge 516, second edge 518 opposing first edge 516, third edge 520 substantially perpendicular to first edge 516 and second edge 518, and fourth edge 522 opposing third edge 520. Pouch 510 further comprises first wall 512 and second wall 514. Pouch 510 with perimeter 515, first wall 512 and second wall 514 is configured to fully enclose the product space (not specifically enumerated).

First wall 512 comprises first wall first layer 526 and first wall second layer 530. Though not depicted for simplicity's sake, first wall 512 also comprises a first wall pattern connection and a first wall air inlet. Such pattern connection and air inlet are as described above. Second wall 514 may or may not comprise a second wall first layer or a second wall second layer, as each is described in the present application. As such second wall 514 may be as described for second wall 14 in FIGS. 1-4 above. As depicted in FIG. 10, second wall 514 comprises an opening mechanism comprising label 542 placed over scored opening 544.

As first wall first layer 526, first wall second layer 530 and second wall 514 are coextensive, each of first seal 517 (at first edge 516) and second seal 519 (at second edge 518) comprises first wall first layer 526, first wall second layer 530 and second wall 514.

Third edge 520 comprises third edge gusset member 582 comprising gusset member fold 583. Third edge gusset member 582 may be formed in a fold between and connecting first wall 512 and second wall 514 (e.g., first wall first layer 526 extending from first wall 512 to second wall 514, and first wall first layer 526 being identical to second wall 514). Alternatively, third edge gusset member 582 may be inserted and sealed between and connecting first wall 512 (e.g., first wall first layer 526) and second wall 514.

Fourth edge 522 comprises fourth edge gusset member 584. Fourth edge gusset member 584 may be formed in a fold between and connecting first wall 512 and second wall 514 (e.g., first wall first layer 526 extending from first wall 512 to second wall 514, and first wall first layer 526 being identical to second wall 514). Alternatively, fourth edge gusset member 584 may be inserted and sealed between and connecting first wall 512 (e.g., first wall first layer 526) and second wall 514. The composition of fourth edge gusset member 584 may be generally similar, but not necessarily specifically identical, to that of third edge gusset member 582. As a specific non-limiting example, fourth edge gusset member may comprise a material having a machine direction shrinkage value of from 0% shrink to 70% shrink at 90° C.

Figure 11:
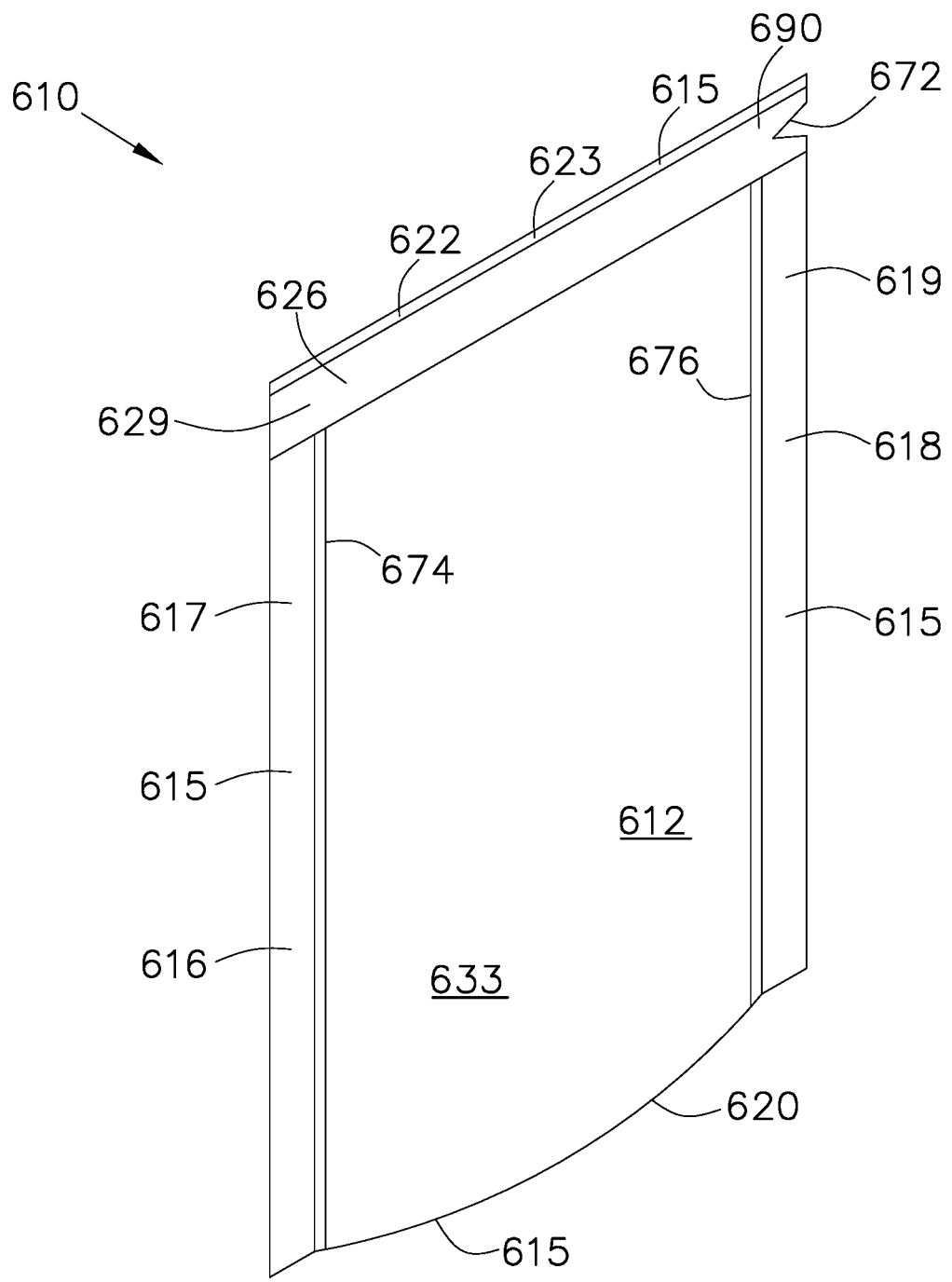
FIG. 11 is a perspective view of a fifth embodiment of a pouch according to the present application.

FIG. 11 is a perspective view of a fifth embodiment of a pouch according to the present application. Pouch 610 comprises perimeter 615 comprising first edge 616, second edge 618 opposing first edge 616, third edge 620 substantially perpendicular to first edge 616 and second edge 618, and fourth edge 622 opposing third edge 620. Pouch 610 further comprises first wall 612 and a second wall (not specifically enumerated). Pouch 610 with perimeter 615, first wall 612 and the second wall is configured to fully enclose the product space (not specifically enumerated).

First wall 612 comprises first wall first layer 626 having outer surface 629 and a first wall second layer (not specifically enumerated) having outer surface 633. The second wall also comprises a second wall first layer and a second wall second layer. The first wall second layer is coextensive with the second wall second layer, first wall first layer 626, and the second wall first layer. As such, first seal 617 (at first edge 616) and second seal 619 (at second edge 618) each comprises the first wall second layer, first wall first layer 626, the second wall first layer, and the second wall second layer. First wall 612 (specifically the first wall second layer) comprises first bending point 674 and second bending point 676. Though not depicted for simplicity's sake, first wall 612 also comprises a first wall pattern connection and a first wall air inlet, and the second wall also comprises a second wall pattern connection and a second wall air inlet. Such pattern connections and air inlets are as described above.

In the embodiment of FIG. 11, the height of first wall first layer 626 is substantially equal to the height of second wall first layer, and such heights are greater than the height of first wall second layer and the height of second wall second layer, which are substantially equal. As such, first wall first layer 626 and the second wall first layer extend "above" the first wall second layer and the second wall second layer and provide header 690. Fourth seal 623 seals first wall first layer 626 to the second wall first layer in header 690. Header 690 comprises tear notch 672 to facilitate opening of pouch 610. In the embodiment of FIG. 11, the materials of first wall first layer 626 and the second wall first layer facilitate a tear across header 690. In other embodiments (not depicted), the header may comprise a score adjacent the tear notch or the header may comprise a tear tape or the header may comprise a zipper. In yet other embodiments, the fourth seal in the header may include a self-venting mechanism. Specific non-limiting examples of a self-venting mechanism include lacquer in the fourth seal; a multilayer first wall first layer comprising an interior micro-perforated layer, an exterior scored layer, and a release lacquer layer between such interior layer and exterior layer: or a micro-perforated first wall first layer. In such embodiments, the first wall air inlet may comprise a hole through the first wall second layer.

In other embodiments, the height of the first wall first layer may be substantially equal to the height of second wall first layer, and such heights may be less than the height of first wall second layer and the height of second wall second layer, which may be substantially equal. As such, the first wall second layer and the second wall second layer may provide a base upon which to stand or rest the pouch.

Figure 12:
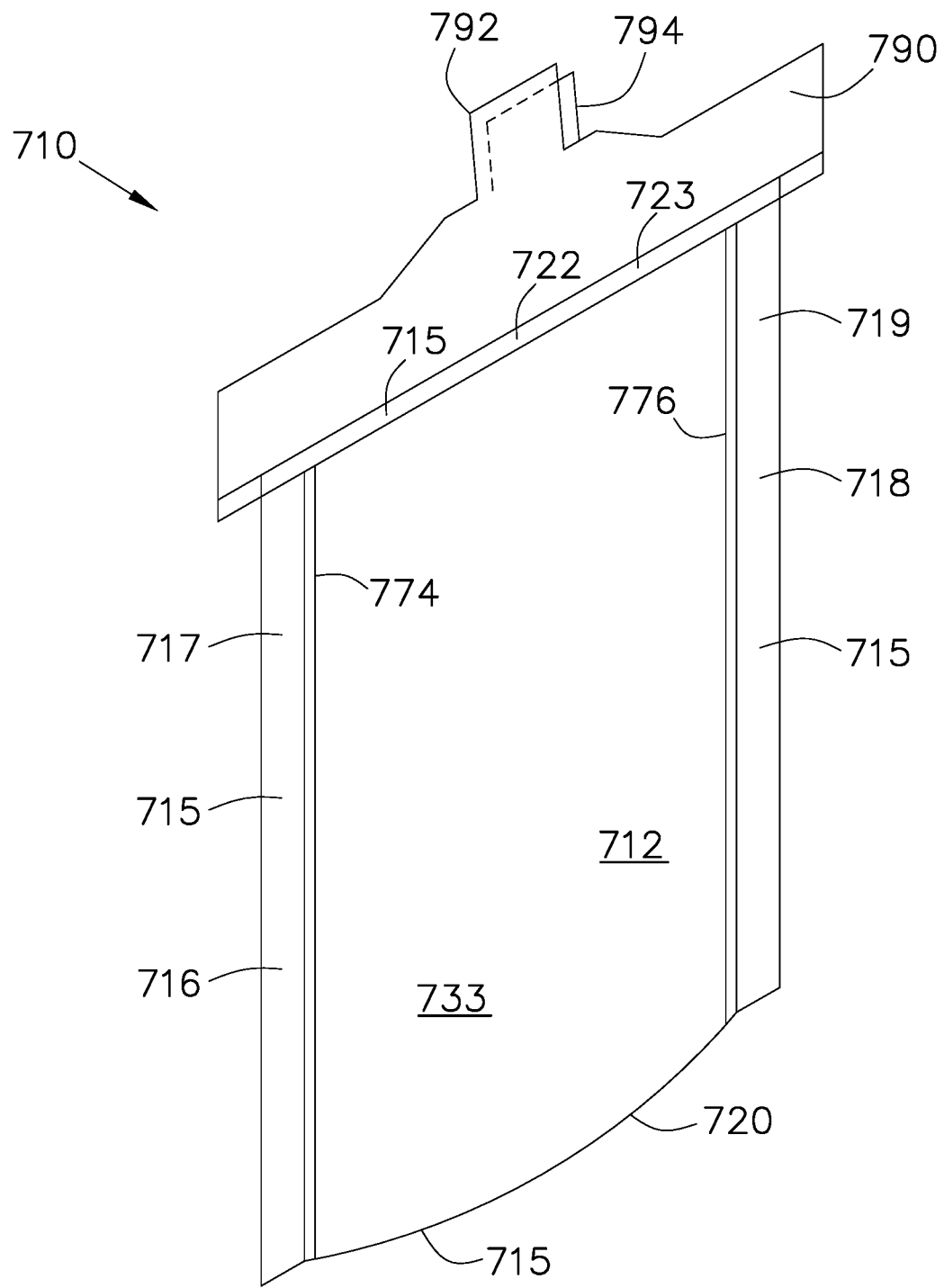
FIG. 12 is a perspective view of a sixth embodiment of a pouch according to the present application.

FIG. 12 is a perspective view of a sixth embodiment of a pouch according to the present application. Pouch 710 comprises perimeter 715 comprising first edge 716, second edge 718 opposing first edge 716, third edge 720 substantially perpendicular to first edge 716 and second edge 718, and fourth edge 722 opposing third edge 720. Pouch 710 further comprises first wall 712 and a second wall (not specifically enumerated). Pouch 710 with perimeter 715, first wall 712 and the second wall is configured to fully enclose the product space (not specifically enumerated).

First wall 712 comprises a first wall first layer (not specifically enumerated) and a first wall second layer (not specifically enumerated) having outer surface 733. The second wall also comprises a second wall first layer and a second wall second layer. The first wall second layer is coextensive with the second wall second layer, the first wall first layer, and the second wall first layer. As such, first seal 717 (at first edge 716) and second seal 719 (at second edge 718) each comprises the first wall second layer, the first wall first layer, the second wall first layer, and the second wall second layer. First wall 712 (specifically the first wall second layer) comprises first bending point 774 and second bending point 776. Though not depicted for simplicity's sake, the first wall also comprises a first wall pattern connection and a first wall air inlet, and the second wall also comprises a second wall pattern connection and a second wall air inlet. Such pattern connections and air inlets are as described above.

In the embodiment of FIG. 12, the height of first wall 712 (including the first wall first layer and the first wall second layer) is substantially equal to the height of the second wall (including the second wall first layer and the second wall second layer). Fourth seal 723 seals first wall 712 (specifically the first wall first layer) to the second wall (specifically the second wall first layer) at fourth edge 722. Header 790 is provide as a separate piece "above" first wall 712 and the second wall and is located adjacent fourth edge 722. Header 790 comprises first tab 792 and second tab 794. To open pouch 710, a user may grab each of first tab 792 and second tab 794 and pull header 790 toward first wall 712 and the second wall to open fourth seal 723.

In some embodiments, opening fourth seal 723 exposes the first wall air inlet and the second wall air inlet. In some embodiments, the separate header may be peeled down; in other embodiments, the separate header may be peeled off. In yet other embodiments, the header may comprise a score, a tear notch, a tear tape, or a zipper.

Figure 13:
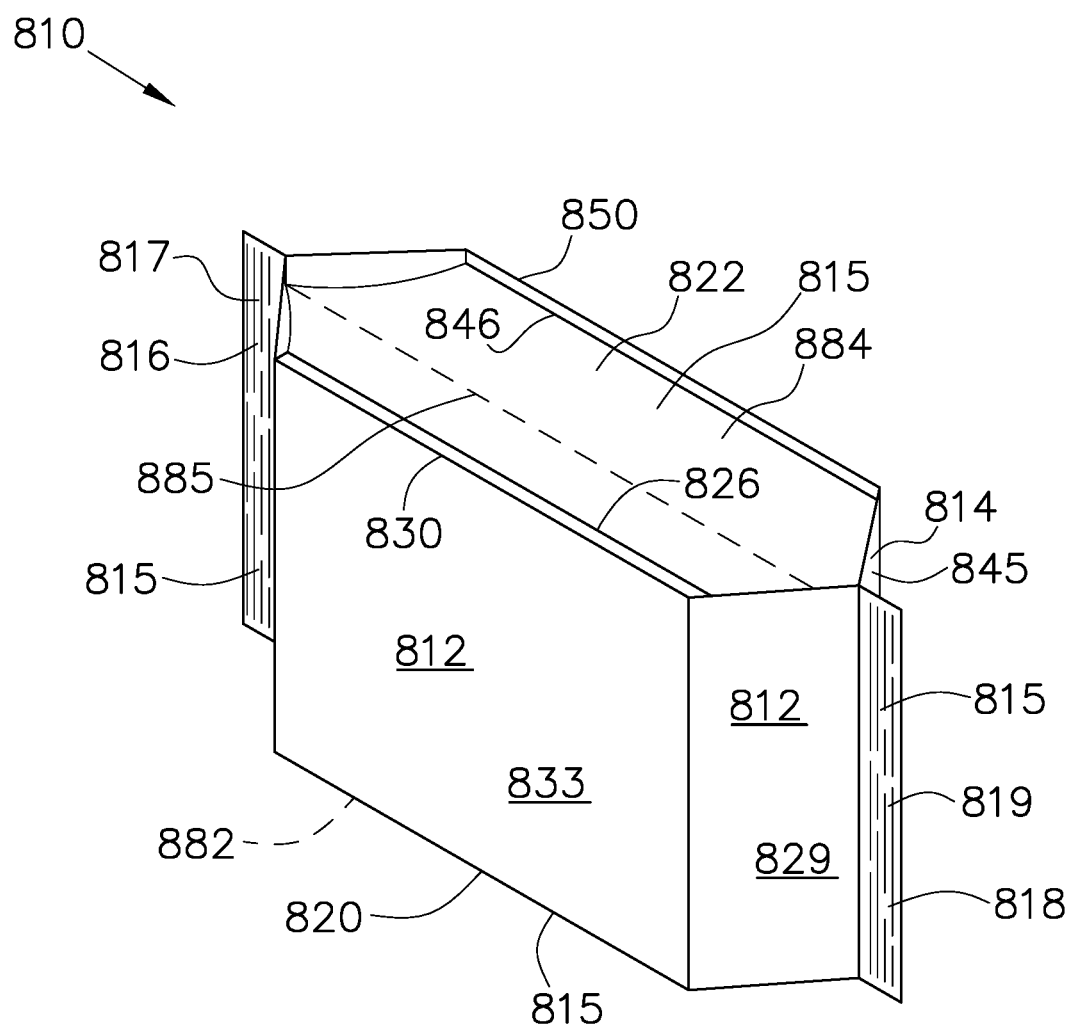
FIG. 13 is a perspective view of a seventh embodiment of a pouch according to the present application.

FIG. 13 is a perspective view of a seventh embodiment of a pouch according to the present application. Pouch 810 comprises perimeter 815 comprising first edge 816, second edge 818 opposing first edge 816, third edge 820 substantially perpendicular to first edge 816 and second edge 818, and fourth edge 822 opposing third edge 820. Pouch 810 further comprises first wall 812 and second wall 814. Pouch 810 with perimeter 815, first wall 812 and second wall 814 is configured to fully enclose the product space (not specifically enumerated).

First wall 812 comprises first wall first layer 826 and first wall second layer 830. First wall first layer 826 has outer surface 829, and first wall second layer 830 has outer surface 833. Second wall 814 comprises a second wall first layer 846 and a second wall second layer 850. Second wall first layer 846 has outer surface 845. Though not depicted for simplicity's sake, first wall 812 also comprises a first wall pattern connection and a first wall air inlet, and second wall 814 also comprises a second wall pattern connection and a second wall air inlet. Such pattern connections and air inlets are as described above.

First wall second layer 830 is coextensive with second wall second layer 850, as the widths (i.e., the distance from first edge 816 to second edge 818) of each are substantially equal. However, first wall second layer 830 is not coextensive with first wall first layer 826, and second wall second layer 850 is not coextensive with second wall first layer 846. The width of first wall first layer 826 is substantially equal to the width of second wall first layer 846, and such widths are greater than the width of each of first wall second layer 830 and second wall second layer 850. As such, each of first seal 817 (at first edge 816) and second seal 819 (at second edge 818) comprises first wall first layer 826 and second wall first layer 946, but not first wall second layer 830 and second wall second layer 850.

Third edge 820 comprises third edge gusset member 882, and fourth edge 822 comprises fourth edge gusset member 884. Fourth edge gusset member 884 further comprises gusset member score 885 located adjacent fourth edge 822. Gusset member score 885, when activated (i.e., opened), provides access to the product space.

Figure 14:
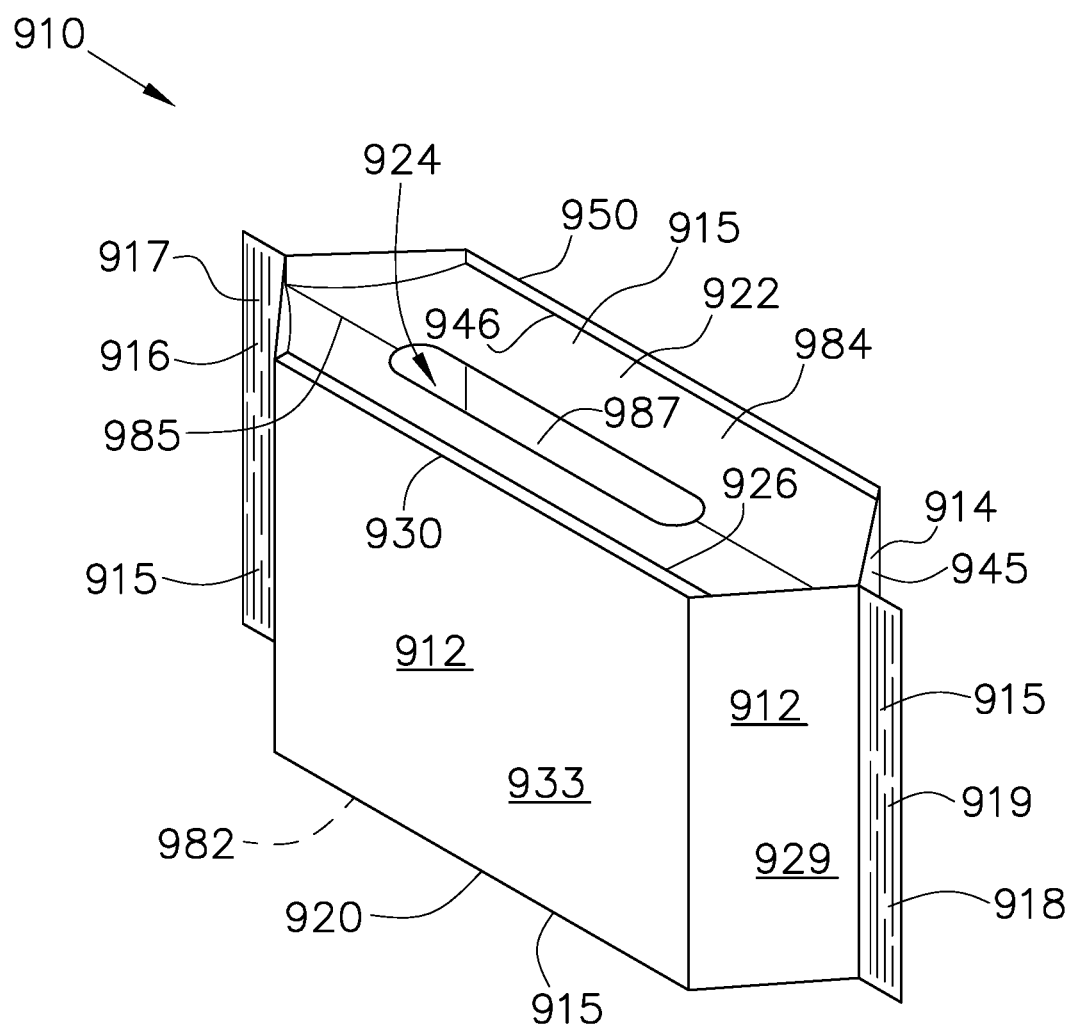
FIG. 14 is a perspective view of the pouch of FIG. 13 upon activation of the opening mechanism.

FIG. 14 is a perspective view of the pouch of FIG. 13 upon activation of the opening mechanism. Pouch 910 comprises perimeter 915 comprising first edge 916, second edge 918 opposing first edge 916, third edge 920 substantially perpendicular to first edge 916 and second edge 918, and fourth edge 922 opposing third edge 920. Pouch 910 further comprises first wall 912 and second wall 914. Pouch 910 with perimeter 915, first wall 912 and second wall 914 is configured to fully enclose product space 924.

First wall 912 comprises first wall first layer 926 and first wall second layer 930. First wall first layer 926 has outer surface 929, and first wall second layer 930 has outer surface 933. Second wall 914 comprises a second wall first layer 946 and a second wall second layer 950. Second wall first layer 946 has outer surface 945. Though not depicted for simplicity's sake, first wall 912 also comprises a first wall pattern connection and a first wall air inlet, and second wall 914 also comprises a second wall pattern connection and a second wall air inlet. Such pattern connections and air inlets are as described above.

As in FIG. 13, first wall second layer 930 is coextensive with second wall second layer 950, as the widths (i.e., the distance from first edge 916 to second edge 918) of each are substantially equal. However, first wall second layer 930 is not coextensive with first wall first layer 926, and second wall second layer 950 is not coextensive with second wall first layer 946. The width of first wall first layer 926 is substantially equal to the width of second wall first layer 946, and such widths are greater than the width of each of first wall second layer 930 and second wall second layer 950. As such, each of first seal 917 (at first edge 916) and second seal 919 (at second edge 918) comprises first wall first layer 926 and second wall first layer 946, but not first wall second layer 930 and second wall second layer 950.

Third edge 920 comprises third edge gusset member 982, and fourth edge 922 comprises fourth edge gusset member 984. Fourth edge gusset member 884 further comprises activated (i.e. opened) gusset member score 885, now gusset member opening 987. To open gusset member score 885, a user may press, puncture or otherwise separate it to create gusset member opening 987 and to access product space 924

The pouch described in the present application may be any one of a variety of shapes. As depicted in the embodiments of FIGS. 1, 5, 7, 10, 11, and 13, pouch 10 may be generally rectangular in shape. FIGS. 15-21 depict other, non-limiting shapes for the pouch described in the present application.

Figure 15:
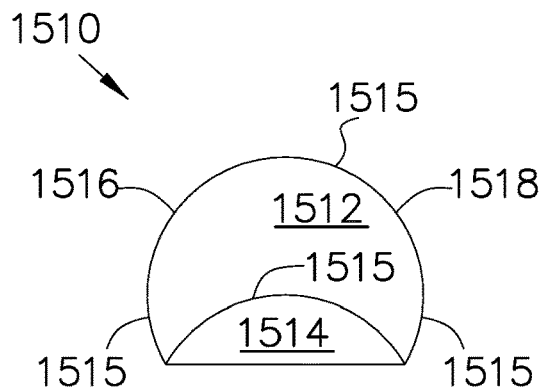
FIG. 15 is a schematic top view of an eighth embodiment of a pouch according to the present application.

FIG. 15 is a schematic top view of an eighth embodiment of a pouch according to the present application. Pouch 1510 is a generally circular shape and is depicted with an upturned portion. Pouch 1510 comprises perimeter 1515 comprising first edge 1516 and second edge 1518 opposing first edge 1516. Pouch 1510 further comprises first wall 1512 and second wall 1514.

Figure 16:
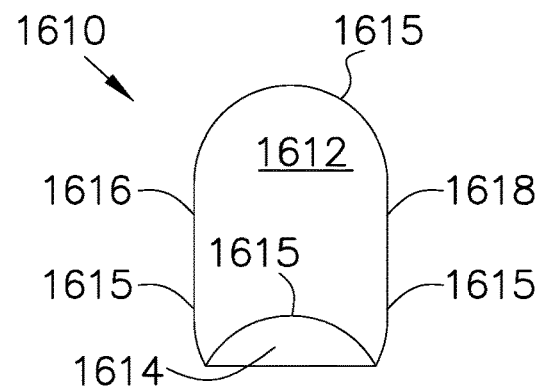
FIG. 16 is a schematic top view of a ninth embodiment of a pouch according to the present application.

FIG. 16 is a schematic top view of a ninth embodiment of a pouch according to the present application. Pouch 1610 is a generally oval shape and is depicted with an upturned portion. Pouch 1610 comprises perimeter 1615 comprising first edge 1616 and second edge 1618 opposing first edge 1616. Pouch 1610 further comprises first wall 1612 and second wall 1614.

Figure 17:
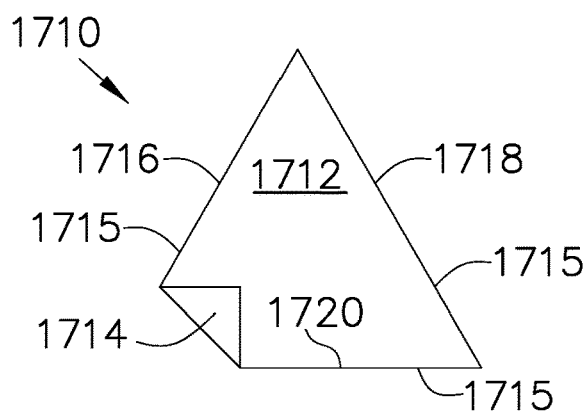
FIG. 17 is a schematic top view of a tenth embodiment of a pouch according to the present application.

FIG. 17 is a schematic top view of a tenth embodiment of a pouch according to the present application. Pouch 1710 is a generally triangular shape and is depicted with an upturned portion. Pouch 1710 comprises perimeter 1715 comprising first edge 1716, second edge 1718 opposing first edge 1716, and third edge 1720 between first edge 1716 and second edge 1718. Pouch 1710 further comprises first wall 1712 and second wall 1714.

Figure 18:
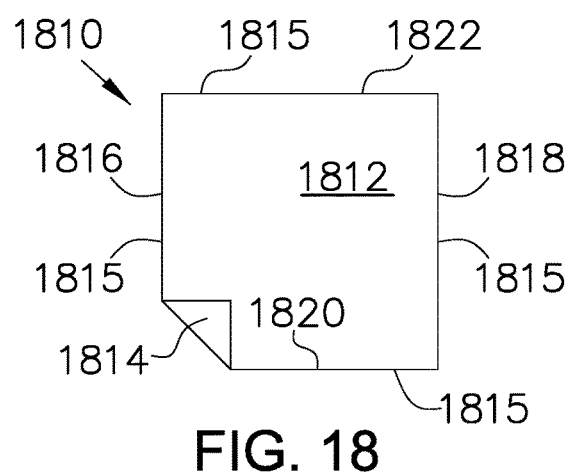
FIG. 18 is a schematic top view of an eleventh embodiment of a pouch according to the present application.

FIG. 18 is a schematic top view of an eleventh embodiment of a pouch according to the present application. Pouch 1810 is a generally square shape and is depicted with an upturned portion. Pouch 1810 comprises perimeter 1815 comprising first edge 1816, second edge 1818 opposing first edge 1816, third edge 1820 substantially perpendicular to first edge 1816 and second edge 1818, and fourth edge 1822 opposing third edge 1820. Pouch 1810 further comprises first wall 1812 and second wall 1814.

Figure 19:
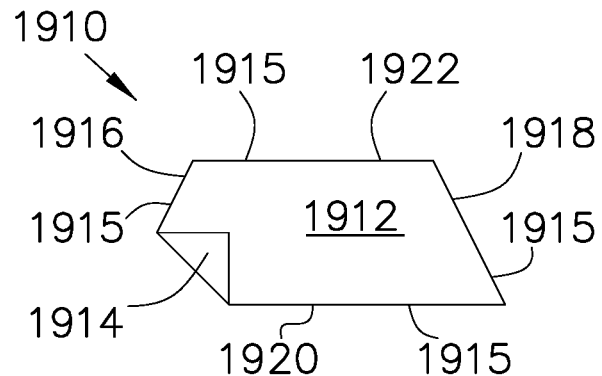
FIG. 19 is a schematic top view of a twelfth embodiment of a pouch according to the present application.

FIG. 19 is a schematic top view of a twelfth embodiment of a pouch according to the present application. Pouch 1910 is a generally trapezoidal shape and is depicted with an upturned portion. Pouch 1910 comprises perimeter 1915 comprising first edge 1916, second edge 1918 opposing first edge 1916, third edge 1920 between first edge 1916 and second edge 1918, and fourth edge 1922 opposing third edge 1920. Pouch 1910 further comprises first wall 1912 and second wall 1914. With the generally trapezoidal shape of pouch 1910, the length (i.e., the distance from first edge 1916 to second edge 1918) of third edge 1920 is greater than the length of fourth edge 1922.

Figure 20:
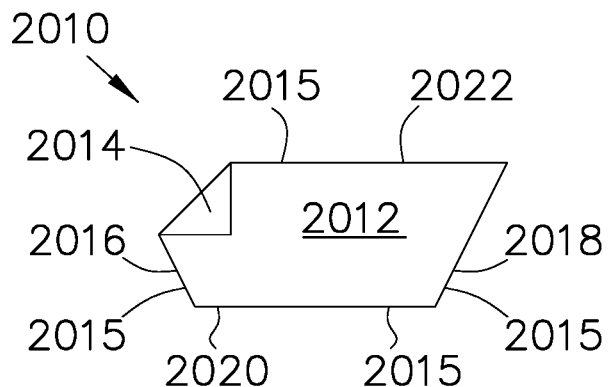
FIG. 20 is a schematic top view of a thirteenth embodiment of a pouch according to the present application.

FIG. 20 is a schematic top view of a thirteenth embodiment of a pouch according to the present application. Pouch 2010 is a generally inverted trapezoidal shape and is depicted with an upturned portion. Pouch 2010 comprises perimeter 2015 comprising first edge 2016, second edge 2018 opposing first edge 2016, third edge 2020 between first edge 2016 and second edge 2018, and fourth edge 2022 opposing third edge 2020. Pouch 2010 further comprises first wall 2012 and second wall 2014. With the generally trapezoidal shape of pouch 2014, the length (i.e., the distance from first edge 2016 to second edge 2018) of third edge 2020 is shorter than the length of fourth edge 2022.

Figure 21:
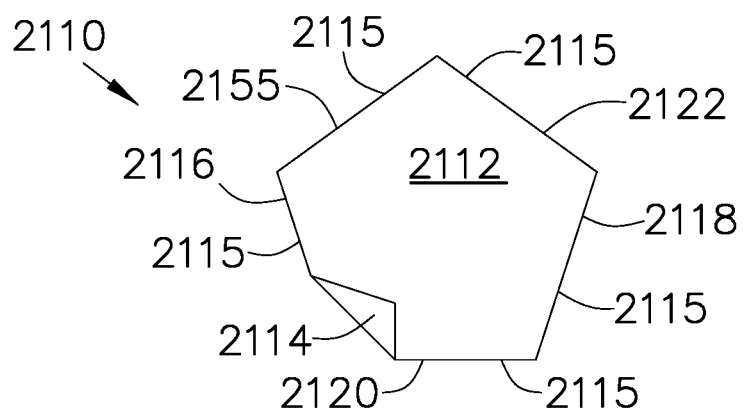
FIG. 21 is a schematic top view of a fourteenth embodiment of a pouch according to the present application.

FIG. 21 is a schematic top view of a fourteenth embodiment of a pouch according to the present application. Pouch 2110 is a generally pentagonal shape and is depicted with an upturned portion. Pouch 2110 comprises perimeter 2115 comprising first edge 2116, second edge 2118 opposing first edge 2016, third edge 2120 between first edge 2116 and second edge 2118, fourth edge 2122 adjacent second edge 2118, and fifth edge 2155 adjacent first edge 2116. Pouch 2110 further comprises first wall 2112 and second wall 2114.

Specific non-limiting examples of methods of making the pouch described in the present application include the following. A first wall first layer may be acquired or produced by means known in the art (such as, for example, blown film extrusion or co-extrusion, slot cast extrusion or co-extrusion, lamination, coating, etc.) with orientation and/or annealing as needed to achieve a machine direction shrinkage value of greater than 5% shrink at 90° C. A first wall second layer may also be acquired or produced by means known in the art (such as, for example, wet-laid, air-laid, dry-laid, electrostatically-laid, spunlaced, spunlaid, blown film extrusion or co-extrusion, slot cast extrusion or co-extrusion, lamination, coating, etc.). A second wall may also be acquired or produced. As described in the present application, in some embodiments, the second wall comprises a second wall first layer and a second wall second layer. Such may be acquired or produced by substantially similar, but not necessarily identical means, as those for the first wall.

To make the pouch described in the present application, the first wall first layer and the second wall first layer may be converted into a pouch via pouch-making means known in the art. First wall second layer and second wall second layer may then be applied as labels (by means known in the art) to the first wall first layer and the second wall first layer, respectively.

Alternatively, the first wall first layer and the first wall second layer may be adhered to one another, and the second wall first layer and the second wall second layer may be adhered to one another (again, each by means known in the art, including but not limited to use of pattern connection). The first wall and the second wall may then be converted into a pouch via pouch-making means known in the art.

EXAMPLES

To further exemplify the various embodiments of the present application, several example first layers and example second layers were produced (and/or acquired) and tested for various properties. TABLE 1 provides information regarding example (and comparative example) first layers (FL), and TABLE 2 provides information regarding example (and comparative example) second layers (SL).

TABLE 1

| | Material | MD orientation ratio | Post-orientation thickness (mil (micron)) | | Shrinkage value at 90° C. (%) | | Maximum shrink force (g) | | Temperature (° C.) at maximum shrink force | |
|---|---|---|---|---|---|---|---|---|---|---|
| | | | MD | TD | MD | TD | MD | TD | MD | TD |
| FL Ex 1 | COC + VLDPE | 3:1 | 1.24 (31.5) | | 50 | −3 | 911 | | 74 | |
| FL Ex 2 | SBC | 4:1 | | | 68 | −3 | 279 | 5 | 55 | 135 |
| FL Ex 3 | mLLDPE + processing aids/LLDPE + tie/ nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + | 1.5:1 | 3.30 (83.8) | | 19 | −3 | 969 | | 96 | |

TABLE 1-continued

| | Material | MD orientation ratio | Post-orientation thickness (mil (micron)) | | Shrinkage value at 90° C. (%) | | Maximum shrink force (g) | | Temperature (° C.) at maximum shrink force | |
|---|---|---|---|---|---|---|---|---|---|---|
| | | | MD | TD | MD | TD | MD | TD | MD | TD |
| | nylon 6/6,6/LLDPE + tie/mLLDPE + processing aids | | | | | | | | | |
| FL Ex 4 | mLLDPE + processing aids/LLDPE + tie/ nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mLLDPE + processing aids | 2:1 | 2.58 (65.5) | | 20 | −2 | 966 | | 96 | |
| FL Ex 5 | mLLDPE + processing aids/LLDPE + tie/ nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mLLDPE + processing aids | 3:1 | 1.84 (46.7) | | 17 | −1 | 988 | | 97 | |
| FL Ex 6 | mLLDPE + processing aids/LLDPE + tie/ nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mLLDPE + processing aids | 4:1 | 1.44 (36.6) | | 15 | 0 | 982 | | 97 | |
| FL Ex 7 | PP impact copolymer + PP homopolymer/ PP impact copolymer + PP homopolymer/ PP impact copolymer + PP homopolymer + processing aids | 1.5:1 | 2.32 (58.9) | 2.34 (59.4) | 16 | −3 | 440 | 11 | 78 | 23 |
| FL Ex 8 | PP impact copolymer + PP homopolymer/ PP impact copolymer + PP homopolymer/ PP impact copolymer + PP homopolymer + processing aids | 2:1 | 1.93 (49.0) | 1.82 (46.2) | 22 | −3 | 315 | 18 | 94 | 124 |
| FL Ex 9 | PP impact copolymer + PP homopolymer/ PP impact copolymer + PP homopolymer/ PP impact copolymer + PP homopolymer + processing aids | 3:1 | 1.12 (28.4) | | 18 | −1 | 280 | | 143 | |
| FL Ex 10 | PP impact copolymer + PP homopolymer/ PP impact copolymer + PP homopolymer/ PP impact copolymer + PP homopolymer + processing aids | 4:1 | 0.81 (20.6) | | 16 | 0 | 282 | | 96 | |
| FL Ex 11 | LLDPE + LDPE + processing aids/HDPE + MDPE/mLLDPE + processing aid | 2:1 | 2.72 (69.1) | 3.02 (76.7) | 21 | −1 | 719 | 21 | 104 | 88 |
| FL Ex 12 | PP random copolymer | 2:1 | 1.74 (44.2) | | 9 | −2 | 237 | | 92 | |
| FL Ex 13 | PP random copolymer | 4:1 | 0.89 (22.6) | | 7 | 0 | 275 | | 94 | |
| FL Ex 14 | LDPE + processing aids/LDPE + EVA/PP random copolymer/VLDPE + EVA/PP random copolymer/VLDPE + EVA/LLDPE + mLLDPE + processing aids | 1.5:1 | 1.95 (49.5) | 1.96 (49.8) | 18 | −5 | 224 | 13 | 78 | 91 |
| FL Ex 15 | LDPE + processing aids/LDPE + EVA/PP random copolymer/VLDPE + EVA/PP random copolymer/VLDPE + EVA/LLDPE + mLLDPE + processing aids | 2:1 | 1.50 (38.1) | 1.71 (43.4) | 25 | −4 | 281 | 18 | 77 | 113 |
| FL Ex 16 | LLDPE + processing aids/mLLDPE + processing aids/PP impact copolymer/ mLLDPE/PP impact copolymer/mLLDPE processing aids/mLLDPE + processing aids | 2:1 | 3.14 (80.0) | 3.06 (77.7) | 29 | −5 | 736 | 23 | 85 | 114 |
| FL Ex 17 | LLDPE + mLLDPE + processing aids/ VLDPE + EVA/PP random copolymer + PP homopolymer/VLDPE + EVA/PP random copolymer + PP homopolymer/VLDPE + EVA/PP random copolymer + PP homopolymer + processing aids | 2:1 | 3.14 (80.0) | 2.85 (72.4) | 15 | −4 | 470 | 13 | 89 | 123 |
| FL Ex 18 | VLDPE + processing aids/HDPE + processing aids/tie/EVOH/tie/VLDPE + LDPE/COC + mLLDPE + processsing aids | 1.5:1 (60° C. annealing) | 1.56 (39.6) | | 26 | 0 | 436 | | 80 | |
| FL Ex 19 | VLDPE + processing aids/HDPE + processing aids/tie/EVOH/tie/VLDPE + LDPE/COC + mLLDPE + processing aids | 2:1 (60° C. annealing) | 1.48 (37.6) | | 32 | 0 | 462 | | 82 | |
| FL Ex 20 | EVA + mLLDPE + processing aids/LLDPE + COC + processing aids/EVA + LLDPE + processing aids | 1.5:1 (60° C. annealing) | 1.52 (38.6) | | 31 | 0 | 364 | | 74 | |
| FL Ex 21 | EVA + mLLDPE + processing aids/LLDPE + COC + processing aids/EVA + LLDPE + processing aids | 1.5:1 (40° C. annealing) | 1.49 (37.8) | | 31 | 0 | 344 | | 77 | |
| FL Ex 22 | EVA + mLLDPE + processing aids/LLDPE + COC + processing aids/EVA + LLDPE + processing aids | 1.25:1 (40° C. annealing) | 1.63 (41.4) | | 23 | 0 | 286 | | 72 | |

TABLE 1-continued

| | Material | MD orientation ratio | Post-orientation thickness (mil (micron)) MD | TD | Shrinkage value at 90° C. (%) MD | TD | Maximum shrink force (g) MD | TD | Temperature (° C.) at maximum shrink force MD | TD |
|---|---|---|---|---|---|---|---|---|---|---|
| FL Ex 23 | EVA + mLLDPE + processing aids/LLDPE + COC + processing aids/EVA + LLDPE + processing aids | 2:1 (40° C. annealing) | 1.05 (26.7) | | 42 | 0 | 343 | | 73 | |
| FL Ex 24 | LLDPE + processing aids/LLDPE + COC/tie/EVOH/tie/LLDPE + COC/LLDPE + processing aids | 1.5:1 (70° C. annealing) | | | | | | | | |
| FL Ex 25 | LLDPE + LDPE + processing aids/LLDPE + COC/tie/EVOH/tie/LLDPE + COC/LLDPE + LDPE + processing aids | 1.5:1 (70° C. annealing) | | | | | | | | |
| FL Ex 26 | OPET/pattern adhesixe/FL Ex 8 | | 2.0-2.5 (50.8-63.5) | | | | | | | |
| FL Comp Ex 1 | mLLDPE + processing aids/LLDPE + tie/nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mLLDPE + processing aids | no orientation | 5.34 (136) | | 0 | 0 | 11 | | 64 | |

TABLE 2

| | Material | Thickness (mil (micron)) | Gurley stiffness (mgf) MD | TD | Weight for Gurley stiffness (g) MD | TD | Placement of weight relative to pivot (centimeters) MD | TD |
|---|---|---|---|---|---|---|---|---|
| SL Ex 1 | Kraft paper | 11.5 (292) | 2197.8 | 854.7 | 25 | 10 | 25 | 5 |
| SL Ex 2 | Kraft paper | 13.5 (343) | 2979.2 | 1427.5 | 25 | 10 | 25 | 5 |
| SL Ex 3 | SBS C1S - coated gloss | 12 (305) | 3552.0 | 1878.1 | 50 | 5 | 25 | 10 |
| SL Ex 4 | SBS C1S - coated matte | 10 (254) | 2490.8 | 1252.1 | 50 | 5 | 50 | 5 |
| SL Ex 5 | SBS C1S - coated matte | 12 (305) | 3463.2 | 1607.3 | 50 | 5 | 25 | 5 |
| SL Ex 6 | SBS C1S - coated matte | 14 (356) | 5325.1 | 2637.6 | 50 | 10 | 25 | 10 |
| SL Ex 7 | SBS with polyethylene coating | 14 (356) | | | | | | |
| SL Ex 8 | SBS with polyethylene coating | 15 (381) | | | | | | |
| SL Ex 9 | SBS with polyethylene coating | 16 (406) | | | | | | |
| SL Ex 10 | PP homopolymer A | 15 (381) | 2202.2 | 2228.9 | 25 | 10 | 25 | 10 |
| SL Ex 11 | PP homopolymer A | 15 (381) | 2100.1 | 2082.4 | 25 | 10 | 25 | 10 |
| SL Ex 12 | PP homopolymer B | 15 (381) | 3644.9 | 3956.0 | 50 | 10 | 50 | 10 |
| SL Ex 13 | PP homopolymer C - high clarity sheet | 12 (305) | 1878.1 | 1536.2 | 50 | 5 | 50 | 5 |
| SL Ex 14 | PP homopolymer C - high clarity sheet | 14 (356) | 2720.3 | 2675.9 | 50 | 10 | 50 | 10 |
| SL Ex 15 | PP homopolymer C - high clarity sheet | 18 (457) | 5654.0 | 6151.9 | 200 | 5 | 200 | 5 |
| SL Ex 16 | PVC sheet | 10 (254) | 1269.8 | 1314.2 | 50 | 5 | 50 | 5 |
| SL Ex 17 | PVC sheet | 14 (356) | 3289.5 | 3058.1 | 50 | 10 | 50 | 10 |
| SL Ex 18 | PVC sheet | 16 (406) | 4107.2 | 4960.6 | 200 | 5 | 200 | 5 |
| SL Ex 19 | APET sheet A | 10 (254) | 1287.6 | 1340.9 | 50 | 5 | 50 | 5 |
| SL Ex 20 | APET sheet A | 14 (356) | 3538.2 | 3627.1 | 200 | 5 | 200 | 5 |
| SL Ex 21 | APET sheet A | 20 (508) | 10356.9 | 9992.4 | 200 | 5 | 200 | 5 |
| SL Ex 22 | APET sheet B | 10 (254) | 1500.7 | 1522.9 | 50 | 5 | 50 | 5 |
| SL Ex 23 | APET sheet B | 15 (381) | 4391.7 | 4391.7 | 200 | 5 | 200 | 5 |
| SL Ex 24 | APET sheet B | 20 (504) | 10134.6 | 9601.2 | 200 | 5 | 200 | 5 |
| SL Comp Ex 1 | Kraft paper | 8.3 (211) | 734.8 | 257.8 | 25 | 5 | 5 | 10 |
| SL Comp Ex 2 | mLLDPE + processing aids/LLDPE + tie/nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mLLDPE + processing aids | 3.5 (89) | 10.1 | 11.0 | 5 | 5 | 5 | 5 |
| SL Comp Ex 3 | VLDPE + LLDPE + processing aids/VLPDE + tie/nylon 6/VLDPE + tie/nylon 6/VLDPE + tie/nylon 6 + nylon 6I/6T + processing aids | 10 (254) | 267.5 | 257.5 | 25 | 10 | 25 | 10 |
| SL Comp Ex 4 | mLLDPE + LDPE + processing aids/VLDPE + EVA/tie/EVOH/tie/LLDPE + EVA/VLDPE + LLDPE + processing aids | 1.75 (44.5) | 4.6 | 6.1 | 5 | 2.5 | 5 | 2.5 |

For TABLE 1, a negative shrinkage value indicates the sample grew in that direction. For Table 1 and TABLE 2, a blank cell indicates that data point was not determined.

Several example first wall and example third edge gusset members were then produced. TABLE 3 provides information regarding example (and comparative example) first walls (FW), and TABLE 4 provides information regarding example third edge gusset members (GM).

TABLE 3

|  | Materials | Pattern Connection | Air inlet |
|---|---|---|---|
| FW Ex 1 | FL Ex 4 + SL Ex 8 | FL sealed to SL at perimeter | Hole in SL |
| FW Ex 2 | FL Ex 8 + SL Ex 7 | FL lane adhesive laminated to SL | Gap adjacent perimeter |
| FW Ex 3 | FL Ex 15 + SL Ex 7 | FL lane adhesive laminated to SL | Gap adjacent perimeter |
| FW Ex 4 | FL Ex 4 + SL Ex 6 | FL sealed to SL at perimeter | Hole in SL |
| FW Ex 5 | FL Ex 3 + SL Ex 6 | FL sealed to SL at perimeter | Hole in SL |
| FW Ex 6 | FL Ex 7 + SL Ex 6 | FL sealed to SL at perimeter | Hole in SL |
| FW Ex 7 | FL Ex 11 + SL Ex 6 | FL sealed to SL at perimeter | Hole in SL |
| FW Ex 8 | FL Ex 12 + SL Ex 6 | FL sealed to SL at perimeter | Hole in SL |
| FW Ex 9 | FL Ex 6 + SL Ex 6 | FL sealed to SL at perimeter | Hole in SL |
| FW Ex 10 | FL Ex 10 + SL Ex 6 | FL sealed to SL at perimeter | Hole in SL |
| FW Ex 11 | FL Ex 8 + SL Ex 6 | FL sealed to SL at perimeter | Hole in SL |
| FW Ex 12 | FL Ex 4 + SL Ex 6 | FL sealed to SL at perimeter | Hole in SL |
| FW Ex 13 | FL Ex 1 + SL Ex 6 | FL sealed to SL at perimeter | Hole in SL |
| FW Ex 14 | FL Ex 3 + SL Ex 12 | FL sealed to SL at perimeter | Hole in SL |
| FW Ex 15 | FL Ex 7 + SL Ex 12 | FL sealed to SL at perimeter | Hole in SL |
| FW Ex 16 | FL Ex 11 + SL Ex 12 | FL sealed to SL at perimeter | Hole in SL |
| FW Ex 17 | FL Ex 12 + SL Ex 12 | FL sealed to SL at perimeter | Hole in SL |
| FW Ex 18 | FL Ex 1 + SL EX 12 | FL sealed to SL at perimeter | Hole in SL |
| FW Ex 19 | FL Ex 3 + SL Ex 11 | FL sealed to SL at perimeter | Hole in SL |
| FW Ex 20 | FL Ex 7 + SL Ex 11 | FL sealed to SL at perimeter | Hole in SL |
| FW Ex 21 | FL Ex 11 + SL EX 11 | FL sealed to SL at perimeter | Hole in SL |
| FW Ex 22 | FL Ex 12 + SL Ex 11 | FL sealed to SL at perimeter | Hole in SL |
| FW Ex 23 | FL Ex 1 + SL Ex 11 | FL sealed to SL at perimeter | Hole in SL |
| FW Ex 24 | FL Ex 6 + SL Ex 4 | FL sealed to SL at perimeter | Hole in SL |
| FW Ex 25 | FL Ex 10 + SL Ex 4 | FL seeled to SL at perimeter | Hole in SL |
| FW Ex 26 | FL Ex 8 + SL Ex 4 | FL sealed to SL at perimeter | Hole in SL |
| FW Ex 27 | FL Ex 4 + SL Ex 4 | FL sealed to SL at perimeter | Hole in SL |
| FW Ex 28 | FL Ex 26 + SL Ex 7 | FL as multilayer with pattern connecting layer FL flood connection to SL | Hole in SL |
| FW Comp Ex. 1 | FL Ex 4 + SL Ex 6 | FL sealed to SL (flood connection) | Hole in SL |

TABLE 4

|  | Material |
|---|---|
| GM Ex 1 | OPET/processing aids/LDPE + LLDPE/VLDPE + LLDPE + processing aids/LLDPE + EVA/tie/EVOH/tie/VLDPE + EVA/mLLDPE + LDPE + processing aids |
| GM Ex 2 | PP random copolymer |
| GM Ex 3 | mLLDPE + processing aids/LLDPE + tie/nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mLLDPE + processing aids |
| GM Ex 4 | mLLDPE + processing aids/LLDPE + tie/nylon 6 + nylon 6/6,6/EVOH/nylon 6 + nylon 6/6,6/LLDPE + tie/EVA/LLDPE + tie/nylon 6 + nylon 6/6,6/EVOH/nylon 6 + nylon 6/6,6/LLDPE + tie/mLLDPE + processing aids (2:1 MD orientation ratio) |
| GM Ex 5 | PP impact copolymer + PP random copolymer + PP homopolymer/PP impact copolymer + PP random copolymer + PP homopolymer/PP impact copolymer + PP random copolymer + PP homopolymer + processing aids |
| GM Ex 6 | nylon 6.6/9 + nylon 6 + nylon 6I/6T + processing aids/mLLDPE + tie + VLDPE + processing aids/nylon 6.6/9 + nylon 6 + nylon 6I/6T/EVOH/nylon 6.6/9 + nylon 6 + nylon 6I/6T/tie + mLLDPE + VLDPE + processing aids/mLLDPE + processing aids (2.5:1 MD onentation ratio; 2.5:1 TD orientation ratio) |

For the third edge gusset members, GM Ex 4 and GM Ex 6 were oriented, as noted. Each had a shrinkage value in either the machine direction or the transverse direction of greater than 5% shrink at 90° C. The other GM examples had a machine direction shrinkage value and a transverse direction shrinkage value of from 0% shrink to 5% shrink at 90° C.

Several example and comparative example pouches and containers were then produced or acquired. TABLE 5 provides details regarding the first wall, the second wall and the third edge gusset member (as applicable) for each. For Examples 1-29 and Comparative Example 1, the first wall was sealed to the second wall at each of the first edge and the second edge; the third edge gusset member was sealed to the corresponding first layers at the third edge without the use of "K seals."

TABLE 5

|  | First Wall | | Second Wall | | Third Edge Gusset Member | | |
|---|---|---|---|---|---|---|---|
|  | material | dimensions | material | dimensions | material | dimensions | notes |
| Ex 1 | FW Ex 1 | 12.7 centimeters height 15.2 centimeters width (top) 12.7 centimeters width (bottom) | FW Ex 1 | 12.7 centimeters height 15.2 centimeters width (top) 12.7 centimeters width (bottom) | GM Ex 6 | 15.2 centimeters length (tapered) 10.2 centimeters width | FW scored 0.6 centimeters from each of first edge and second edge to create bending points GM folded in inverted W |
| Ex 2 | FW Ex 3 | not specified | FW Ex 3 | not specified | GM Ex 1 | not specified | |
| Ex 3 | FW Ex 3 | not specified | FW Ex 28 | not specified | GM Ex 1 | not specified | |
| Ex 4 | FW Ex 4 | 10.2 centimeters height 15.2 centimeters width | FW Ex 4 | 10.2 centimeters height 15.2 centimeters width | GM Ex 4 | 15.2 centimeters length 7.6 centimeters width | FW scored 0.6 centimeters from each of first edge and second edge to create bending points |
| Ex 5 | FW Ex 5 | 10.2 centimeters height 14.0 centimeters width | FW Ex 5 | 10.2 centimeters height 15.2 centimeters width | GM Ex 3 | 15.2 centimeters length 8.9 centimeters width | |
| Ex 6 | FW Ex 6 | 10.2 centimeters height 14.0 centimeters width | JFW Ex 6 | 10.2 centimeters height 15.2 centimeters width | GM Ex 2 | 15.2 centimeters length 8.9 centimeters width | |
| Ex 7 | FW Ex 7 | 10.2 centimeters height 14.0 centimeters width | FW Ex 7 | 10.2 centimeters height 15.2 centimeters width | GM Ex 3 | 15.2 centimeters length 8.9 centimeters width | |
| Ex 8 | FW Ex 8 | 10.2 centimeters height 14.0 centimeters width | FW Ex 8 | 10.2 centimeters height 15.2 centimeters width | GM Ex 2 | 15.2 centimeters length 8.9 centimeters width | |
| Ex 9 | FW Ex 9 | 10.2 centimeters height 14.0 centimeters width | FW Ex 9 | 10.2 centimeters height 15.2 centimeters width | GM Ex 3 | 15.2 centimeters length 8.9 centimeters width | |
| Ex 10 | FW Ex 9 | 10.2 centimeters height 15.2 centimeters width | FW Ex 9 | 10.2 centimeters height 15.2 centimeters width | GM Ex 3 | 15.2 centimeters length 8.9 centimeters width | FW scored 0.6 centimeters from each of first edge and second edge to create bending points |
| Ex 11 | FW Ex 10 | 10.2 centimeters height 14.0 centimeters width | FW Ex 10 | 10.2 centimeters height 15.2 centimeters width | GM Ex 5 | 15.2 centimeters length 8.9 centimeters width | |
| Ex 12 | FW Ex 11 | 10.2 centimeters height 14.0 centimeters width | FW Ex 11 | 10.2 centimeters height 15.2 centimeters width | GM Ex 5 | 15.2 centimeters length 8.9 centimeters width | |
| Ex 13 | FW Ex 12 | 10.2 centimeters height 14.0 centimeters width | FW Ex 12 | 10.2 centimeters height 15.2 centimeters width | GM Ex 3 | 15.2 centimeters length 8.9 centimeters width | |
| Ex 14 | FW Ex 12 | 10.2 centimeters height 15.2 centimeters width | FW Ex 12 | 10.2 centimeters height 15.2 centimeters width | GM Ex 3 | 15.2 centimeters length 8.9 centimeters width | FW scored 0.6 centimeters from each of first edge and second edge to create bending points |
| Ex 15 | FW Ex 13 | 10.2 centimeters height 14.0 centimeters width | FW Ex 13 | 10.2 centimeters height 15.2 centimeters width | GM Ex 3 | 15.2 centimeters length 8.9 centimeters width | |
| Ex 16 | FW Ex 14 | 10.2 centimeters height 14.0 centimeters width | FW Ex 14 | 10.2 centimeters height 15.2 centimeters width | GM Ex 3 | 15.2 centimeters length 8.9 centimeters width | |
| Ex 17 | FW Ex 15 | 10.2 centimeters height 14.0 centimeters width | FW Ex 15 | 10.2 centimeters height 15.2 centimeters width | GM Ex 2 | 15.2 centimeters length 8.9 centimeters width | |
| Ex 18 | FW Ex 16 | 10.2 centimeters height 14.0 centimeters width | FW Ex 16 | 10.2 centimeters height 15.2 centimeters width | GM Ex 3 | 15.2 centimeters length 8.9 centimeters width | |
| Ex 19 | FW Ex 17 | 10.2 centimeters height 14.0 centimeters width | FW Ex 17 | 10.2 centimeters height 15.2 centimeters width | GM Ex 2 | 15.2 centimeters length 8.9 centimeters width | |
| Ex 20 | FW Ex 18 | 10.2 centimeters height 14.0 centimeters width | FW Ex 18 | 10.2 centimeters height 15.2 centimeters width | GM Ex 3 | 15.2 centimeters length 8.9 centimeters width | |
| Ex 21 | FW Ex 19 | 10.2 centimeters height 14.0 centimeters width | FW Ex 19 | 10.2 centimeters height 15.2 centimeters width | GM Ex 3 | 15.2 centimeters length 8.9 centimeters width | |
| Ex 22 | FW Ex 20 | 10.2 centimeters height 14.0 centimeters width | FW Ex 20 | 10.2 centimeters height 15.2 centimeters width | GM Ex 2 | 15.2 centimeters length 8.9 centimeters width | |
| Ex 23 | FW Ex 21 | 10.2 centimeters height 14.0 centimeters width | FW Ex 21 | 10.2 centimeters height 15.2 centimeters width | GM Ex 3 | 15.2 centimeters length 8.9 centimeters width | |
| Ex 24 | FW Ex 22 | 10.2 centimeters height 14.0 centimeters width | FW Ex 22 | 10.2 centimeters height 15.2 centimeters width | GM Ex 2 | 15.2 centimeters length 8.9 centimeters width | |
| Ex 25 | FW Ex 23 | 10.2 centimeters height 14.0 centimeters width | FW Ex 23 | 10.2 centimeters height 15.2 centimeters width | GM Ex 3 | 15.2 centimeters length 8.9 centimeters width | |
| Ex 26 | FW Ex 24 | 10.2 centimeters height 14.0 centimeters width | FW Ex 24 | 10.2 centimeters height 15.2 centimeters width | GM Ex 3 | 15.2 centimeters length 8.9 centimeters width | |
| Ex 27 | FW Ex 25 | 10.2 centimeters height 14.0 centimeters width | FW Ex 25 | 10.2 centimeters height 15.2 centimeters width | GM Ex 5 | 15.2 centimeters length 8.9 centimeters width | |
| Ex 28 | FW Ex 26 | 10.2 centimeters height 14.0 centimeters width | FW Ex 26 | 10.2 centimeters height 15.2 centimeters width | GM Ex 5 | 15.2 centimeters length 8.9 centimeters width | |
| Ex 29 | FW Ex 27 | 10.2 centimeters height 14.0 centimeters width | FW Ex 27 | 10.2 centimeters height 15.2 centimeters width | GM Ex 3 | 15.2 centimeters length 8.9 centimeters width | |
| Comp Ex 1 | FW Comp Ex 1 | 10.2 centimeters height 15.2 centimeters width | FW Comp Ex 1 | 10.2 centimeters height 15.2 centimeters width | GM Ex 4 | 15.2 centimeters length 7.6 centimeters width | FW scored 0.6 centimeters from each of first edge and second edge to create bending points |

TABLE 5-continued

|  | First Wall | | Second Wall | | Third Edge Gusset Member | | |
| --- | --- | --- | --- | --- | --- | --- | --- |
|  | material | dimensions | material | dimensions | material | dimensions | notes |
| Comp Ex 2 | | | printed foamed PS/PP | | | | package was acquired pre-made cup with foamed PS shrink sleeve |
| Comp Ex 3 | | | printed PE coated paper/PP/polyolefin/EVOH/polyolefin/PP | | | | package was acquired pre-made cup with thick PE coated paper label |

For Examples 1, 4, 10, and 14 and Comparative Example 1, the first wall (particularly the first wall second layer) and the second wall (particularly the second wall second layer) were co-extensive in that the width of each was identical. As such, each of the first wall second layer and the second wall second layer were included in the seals at the first edge and the second edge. And the first wall second layer was scored 0.6 centimeters from each of the first edge and the second edge to create a first bending point and a second bending point. Such scoring was through the entirety of the thickness of the first wall second layer except for near the third edge and the fourth edge, where it was scored only partially through the thickness of the first wall second layer.

For Examples 5-9, 11-13, and 15-29, the first wall (particularly the first wall second layer) and the second wall (particularly the second wall second layer) were no co-extensive in that the width of the first wall second layer was less than the width of the second wall second layer. As such, only the second wall second layer was included in the seals at the first edge and the second edge, and no bending points were needed.

Figure 22:
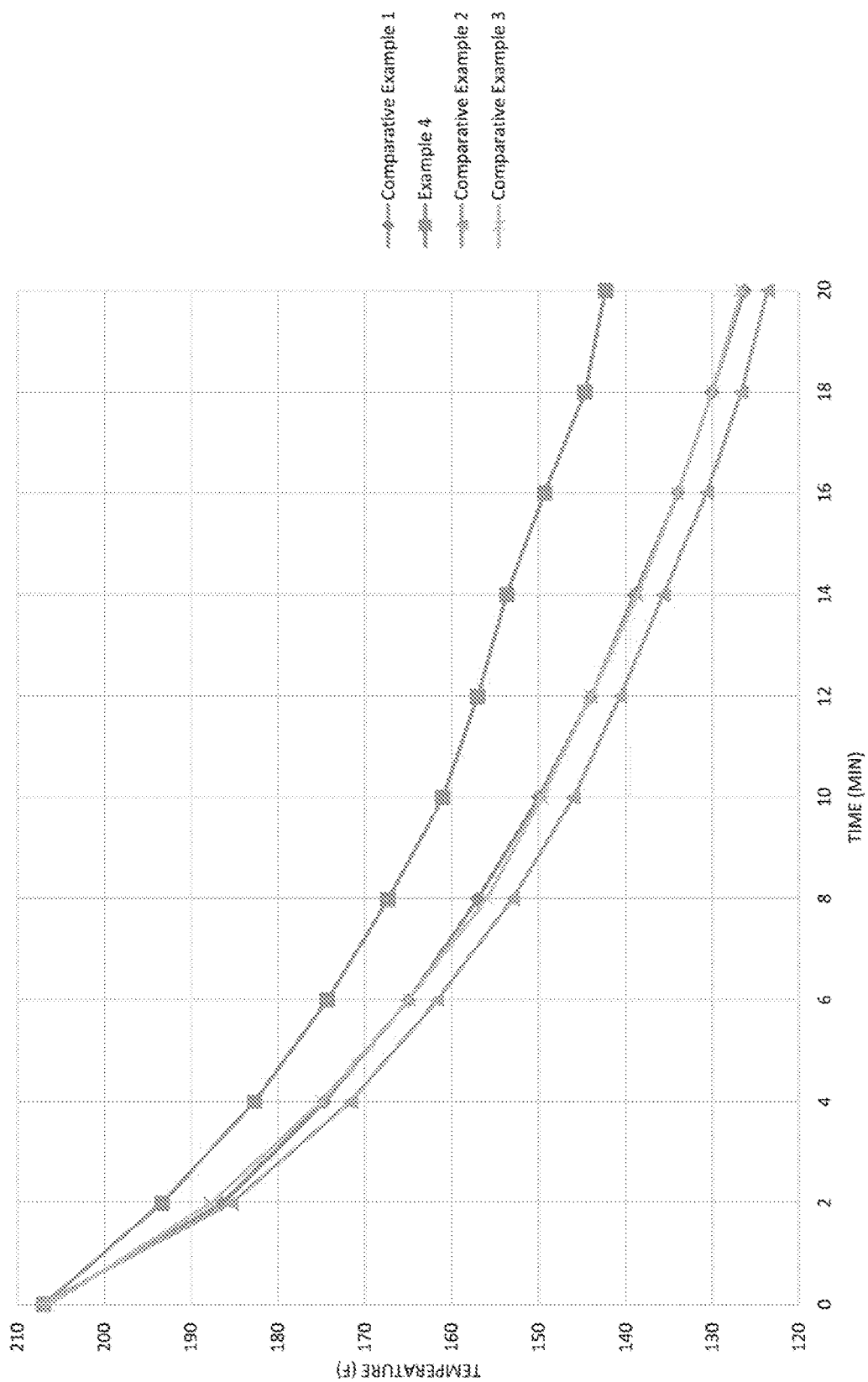
FIG. 22 is a graph depicting the measured water temperature after microwave heating over time for the evaluated example and comparative examples.
Figure 23:
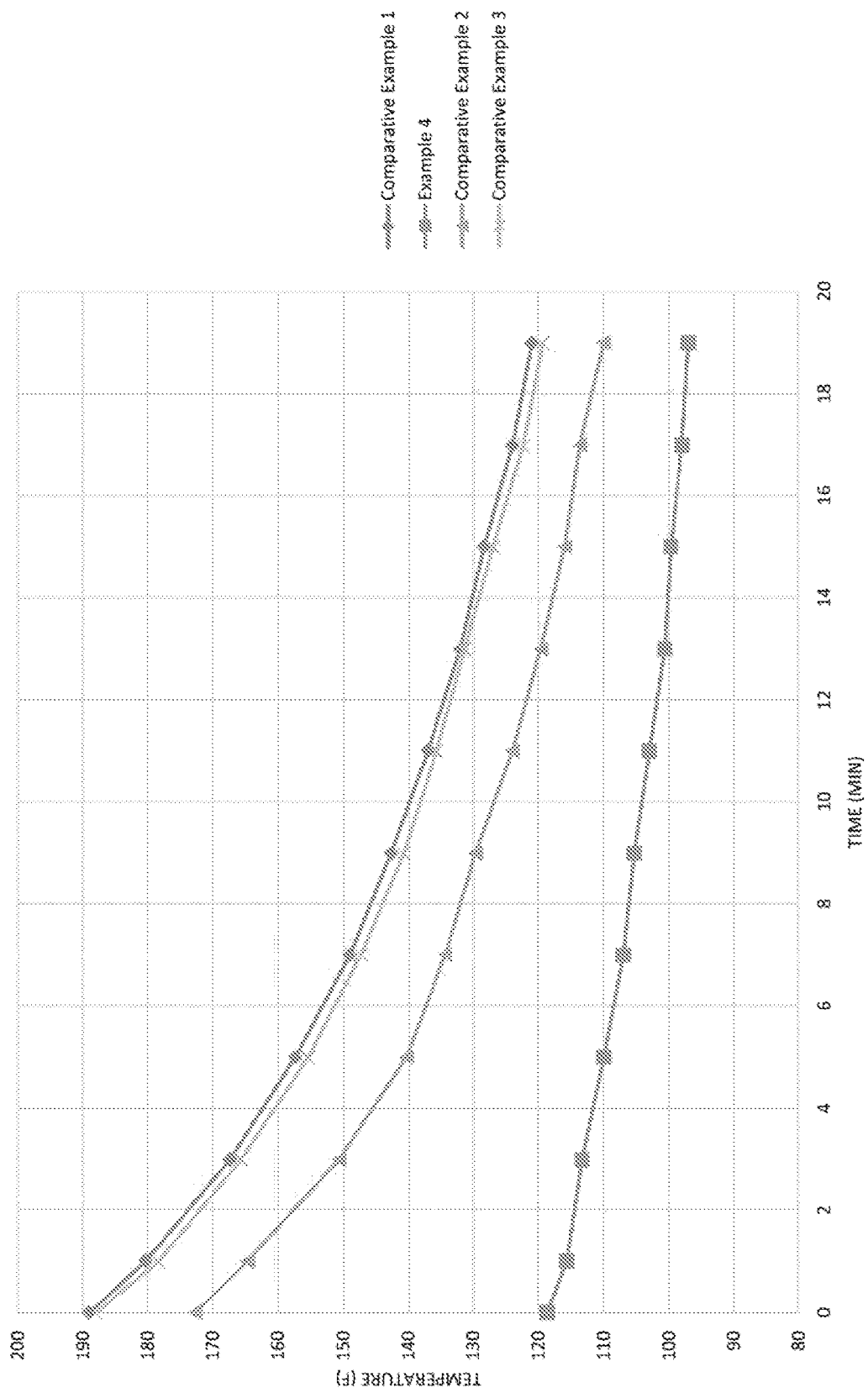
FIG. 23 is a graph depicting the package surface temperature after microwave heating over time for the evaluated example and comparative examples.

Example 4, Comparative Example 1, Comparative Example 2, and Comparative Example 3 were evaluated to determine the insulating properties of each. Prior to heating the samples, the microwave was conditioned by heating a water-filled container (not one as described in the present application) in the microwave for three minutes. To evaluate Example 4, Comparative Example 1, Comparative Example 2, and Comparative Example 3, 200 milliliters of water was added to an empty package of each. A towel was placed over the top of the water-filled package, and the water-filled package was placed in a Whirlpool® microwave (1600 watt, 60 Hz, 120 V, single phase). The covered, water-filled container was microwave heated for 90 seconds, a time-period sufficient to cause the water to boil. The package was removed from the microwave, and the towel was removed from the package. A Fluke® Ti20 Thermal Imager was used to measure both the temperature of the water and the temperature of the package surface over time, with Time 0 as the time the package was removed from the microwave. FIG. 22 is a graph depicting the measured water temperature after microwave heating over time for the evaluated example and comparative examples. As shown by FIG. 22, Example 4 clearly provided a consistently higher water temperature over time, indicating the package contents maintained a warmer temperature over time. FIG. 23 is a graph depicting the package surface temperature after microwave heating over time for the evaluated example and comparative examples. As shown by FIG. 23, Example 4 clearly provided a consistently cooler package surface temperature over time, indicating the package remaining cooler to the touch (and safer to hold) over time.

Example 4 and Comparative Example 1 were evaluated to determine the compression strength of the containers prior to and after exposure to elevated temperatures. Compression strength (also referred to as "top load compression") is a measure of the force required to produce deformation and failure of a container. It is expressed in lbf (or "pounds force") or newtons (where 1 lbf=4.44822 newtons) and was measured by placing a sample in an Instron® Tensile Testing Unit configured for compression testing, with a load cell of 100 pounds (45 kilograms) and a crosshead speed of one inch (2.54 centimeters) per minute. Example 4 prior to exposure to elevated temperatures, Example 4 after exposure to elevated temperatures, and Comparative Example 1 after exposure to elevated temperatures were each separately placed upright (i.e., resting on the third edge gusset member) in the Instron® Tensile Testing Unit configured for compression testing, using the 100 pound load cell, the small platform, and a doorstop to wedge the sample upright (as needed). Example 4 after exposure to elevated temperatures was placed on its side (i.e., resting on the first edge) in the Instron® Tensile Testing Unit configured for compression testing, using the 100 pound load cell, the small platform, and a doorstop to wedge the sample "upright" (as needed). And Example 4 after exposure to elevated temperatures and Comparative Example 1 after exposure to elevated temperatures were each separately placed on the second wall (i.e., resting on the second wall) in the Instron® Tensile Testing Unit configured for compression testing, using the 100 pound load cell, the stiffness wedge, and a doorstop to wedge the sample "upright" (as needed). TABLE 6 reports the compression strength data for the above-described various embodiments and placements of Example 4 and Comparative Example 1.

TABLE 6

|  | Compression Strength lbf (newtons) | | |
| --- | --- | --- | --- |
|  | resting on third edge gusset member | resting on first edge | resting on second wall |
| Example 4 prior to heating | 51.0 (227) | | |
| Example 4 after heating | 85.9 (382) | 7.0 (31.1) | 2.4 (10.7) |
| Comparative Example 1 after heating | 88.1 (392) | | 0.6 (2.67) |

As shown in TABLE 6, Example 4 had a substantially comparable or higher compression strength compared to Comparative Example 1, indicating the pattern connection of Example 4 (in contrast to the flood connection of Comparative Example 1) contributes to and improves the "stiffness" and durability of the pouch as described in the present application.

Examples 5-29 were evaluated to determine the effect of exposure to elevated temperatures on the shape of the container. Prior to heating the samples, the microwave was conditioned by heating a water-filled container (i.e., not one as described in the present application) in the microwave for three minutes. To evaluate Examples 5-29, 200 milliliters of water was added to an empty container for each. The water-filled container was placed in a Whirlpool® microwave (1600 watt, 60 Hz, 120 V, single phase) and heated for 120 seconds to cause the water to boil. The container was removed from the microwave. The distance between the first edge and the second edge (e.g., the distance between E1 and E2 in FIG. 9, or the "E Distance") and the distance between the fourth edge midpoints of the first wall and the second wall (e.g., the distance between M1 and M2 in FIG. 9, or the "M Distance") were measured for each heated container. TABLE 7 reports the ratio of the E Distance to the M Distance for the various examples.

TABLE 7

|  | E Distance/M Distance |
| --- | --- |
| Example 5 | 0.96 |
| Example 6 | 1.03 |
| Example 7 | 0.91 |
| Example 8 | 1.10 |
| Example 9 | 0.73 |
| Example 10 | 0.79 |
| Example 11 | 1.07 |
| Example 12 | 0.76 |
| Example 13 | 0.69 |
| Example 14 | 0.77 |
| Example 15 | 0.54 |
| Example 16 | 0.82 |
| Example 17 | 0.83 |
| Example 18 | 0.56 |
| Example 19 | 1.00 |
| Example 20 | 0.17 |
| Example 21 | 0.59 |
| Example 22 | 0.76 |
| Example 23 | 0.46 |
| Example 24 | 0.92 |
| Example 25 | 0.00 |
| Example 26 | 0.68 |
| Example 27 | 0.84 |
| Example 28 | 0.77 |
| Example 29 | 0.59 |

In embodiments in which the container upon exposure to elevated temperatures might resemble a cup, a can, a cylinder, or the like, an E Distance to M Distance ratio of 0.5 to 1.5 or, optimally, 0.7 to 1.3 or, more optimally, 0.8 to 1.1 may be preferred. In other embodiments in which the container upon exposure to elevated temperatures might resemble a tray or other packaging, an E Distance to M Distance ratio may be less applicable.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed or claimed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application (including the appended claims) governs.

Unless otherwise indicated, all numbers expressing sizes, amounts, ranges, limits, and physical and other properties used in the present application (including the appended claims) are to be understood as being modified in all instances by the term "about". Accordingly, unless expressly indicated to the contrary, the numerical parameters set forth in the present application (including the appended claims) are approximations that can vary depending on the desired properties sought to be obtained by a person of ordinary skill in the art without undue experimentation using the teachings disclosed in the present application.

As used in the present application (including the appended claims), the singular forms "a," "an," and "the" encompass embodiments having plural referents, unless the context clearly dictates otherwise. As used in the present application (including the appended claims), the term "or" is generally employed in its sense including "and/or," unless the context clearly dictates otherwise.

Spatially related terms, including but not limited to, "lower," "upper," "beneath," "below," "above." and "on top." if used in the present application (including the appending claims), are used for ease of description to describe spatial relationships of an element(s) to another. Such spatially related terms encompass different orientations of the device in use or operation, in addition to the particular orientations depicted in the figures and described in the present application (including the appended claims). For example, if an object depicted in the figures is turned over or flipped over, elements previously described as below or beneath other elements would then be above those other elements.

The above description, examples and embodiments disclosed are illustrative only and should not be interpreted as limiting. The present invention includes the description, examples, and embodiments disclosed; but it is not limited to such description, examples, or embodiments. The reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention as described in the claims.

What is claimed is as follows:

1. A pouch comprising a first wall; a second wall; a perimeter comprising a first edge and a second edge opposing the first edge; and a product space positioned between the first wall, the second wall, and the perimeter;
   wherein the pouch is configured to fully enclose the product space; and
   wherein the first wall comprises
      a first wall first layer having a machine direction shrinkage value of greater than 5% shrink at 90° C.,
      a first wall second layer having a machine direction Gurley stiffness force of at least 800 mgf and a machine direction shrinkage value at 90° C. of less than the machine direction shrinkage value of the first wall first layer at 90° C., wherein the first wall first layer is interior the first wall second layer,
      a first wall pattern connection, and
      a first wall air inlet.

2. The pouch of claim 1, wherein the first wall first layer comprises polypropylene, polyethylene, polyimide, polyester, polystyrene, cyclic olefin copolymer, ethylene vinyl-alcohol copolymer, polyvinylidene chloride, ionomer, or blends of such.

3. The pouch of claim 1, wherein the first wall first layer machine direction shrinkage value is from greater than 5% to 70% shrink at 90° C.

4. The pouch of claim 1, wherein the first wall second layer comprises paperboard, nonwoven, polypropylene, polyethylene, polyamide, polyester, polystyrene, cyclic olefin copolymer, polyvinyl chloride, ionomer, or blends of such.

5. The pouch of claim 1, wherein the first wall second layer has a machine direction Gurley stiffness force of from 800 mgf to 12,000 mgf.

6. The pouch of claim 1, wherein the first wall second layer comprises a bending point.

7. The pouch of claim 1, wherein the pouch is free of a susceptor shrink material in direct contact with the first wall first layer.

8. The pouch of claim 1, wherein the pouch comprises an opening mechanism to access the product space.

9. The pouch of claim 8, wherein the opening mechanism is located in the second wall.

10. The pouch of claim 1 wherein the second wall comprises
    a second wall first layer having a machine direction shrinkage value of greater than 5% shrink at 90° C.,
    a second wall second layer having a machine direction Gurley stiffness force of at least 800 mgf and a machine direction shrinkage value at 90° C. of less than machine direction shrinkage value of the second wall first layer at 90° C., wherein the second wall first layer is interior the second wall second layer,
    a second wall pattern connection, and
    a second wall air inlet.

11. The pouch of claim 10 wherein the second wall first layer comprises polypropylene, polyethylene, polyamide, polyester, polystyrene, cyclic olefin copolymer, ethylene vinyl-alcohol copolymer, polyvinylidene chloride, ionomer, or blends of such.

12. The pouch of claim 10 wherein the second wall first layer machine direction shrinkage value is from greater than 5% shrink to 70% shrink at 90° C.

13. The pouch of claim 10, wherein the second wall second layer comprises paperboard, nonwoven, polypropylene, polyethylene, polyamide, polyester, polystyrene, cyclic olefin copolymer, polyvinyl chloride, ionomer, or blends of such.

14. The pouch of claim 10, wherein the second wall second layer has a machine direction Gurley stiffness force of from 800 mgf to 12,000 mgf.

15. The pouch of claim 10 wherein the pouch is free of a susceptor shrink material in direct contact with the second wall first layer.

16. A pouch comprising a first wall; a second wall; a perimeter comprising a first edge, a second edge opposing the first edge, a third edge substantially perpendicular to the first edge and the second edge, and a fourth edge opposing the third edge; a product space positioned between the first wall, the second wall, and the perimeter; and an opening mechanism to access the product space;
    wherein the pouch is configured to fully enclose the product space;
    wherein the opening mechanism is located adjacent the fourth edge;
    wherein the first wall comprises
        a first wall first layer having a machine direction shrinkage value of greater than 5% shrink at 90° C.;
        a first wall second layer having a machine direction Gurley stiffness force of at least 800 mgf and a machine direction shrinkage value at 90° C. of less than the machine direction shrinkage value of the first wall first layer at 90° C., wherein the first wall first layer is interior the first wall second layer,
        a first wall pattern connection, and
        a first wall air inlet;
    wherein the second wall comprises
        a second wall first layer having a machine direction shrinkage value of greater than 5% shrink at 90° C.,
        a second wall second layer having a machine direction Gurley stiffness force of at least 800 mgf and a machine direction shrinkage value at 90° C. of less than the machine direction shrinkage value of the second wall first layer at 90° C., wherein the second wall first layer is interior the second wall second layer,
        a second wall pattern connection, and
        a second wall air inlet; and
    wherein the third edge comprises a third edge gusset member formed in a fold between and connecting the first wall and the second wall or a third edge gusset member inserted and sealed between and connecting the first wall and the second wall.

17. The pouch of claim 16, wherein each of the first wall first layer and the second wall first layer comprises polypropylene, polyethylene, polyamide, cyclic olefin copolymer, or blends of such.

18. The pouch of claim 16, wherein each of the first wall second layer and the second wall second layer comprises paperboard, polypropylene, polyester, polystyrene, or blends of such.

19. The pouch of claim 16, wherein the first edge comprises a first seal comprising the first wall second layer and the second wall second layer, the second edge comprises a second seal comprising the first wall second layer and the second wall second layer, and the first wall second layer comprises a bending point.

20. The pouch of claim 16, wherein the pouch is free of a susceptor shrink material in direct contact with the first wall first layer and the second wall first layer.

* * * * *